United States Patent
Sakai et al.

(10) Patent No.: US 6,383,404 B1
(45) Date of Patent: May 7, 2002

(54) GLASS SUBSTRATE FOR MAGNETIC RECORDING MEDIUM, MAGNETIC RECORDING MEDIUM, AND METHOD OF MANUFACTURING THE SAME

(75) Inventors: Hiroyuki Sakai; Katsutoshi Ono; Syoji Matsuda, all of Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/377,151

(22) Filed: Aug. 19, 1999

(30) Foreign Application Priority Data

Aug. 19, 1998 (JP) ............................ 10-233261

(51) Int. Cl.$^7$ .............................................. C03C 17/00
(52) U.S. Cl. .................. 216/97; 65/31; 65/61
(58) Field of Search ................. 216/97; 65/31, 65/61

(56) References Cited

U.S. PATENT DOCUMENTS

| | | | |
|---|---|---|---|
| 3,231,456 A | | 1/1966 | McMillon et al. |
| 4,833,001 A | * | 5/1989 | Kijima et al. ................. 428/141 |
| 5,268,071 A | * | 12/1993 | Sono et al. .................. 156/663 |
| 5,578,531 A | * | 11/1996 | Kodera et al. ............... 437/228 |
| 5,681,609 A | * | 10/1997 | Kitayama et al. ............ 427/129 |
| 5,725,625 A | * | 3/1998 | Kitayama et al. ........... 65/30.14 |
| 5,785,729 A | * | 7/1998 | Yokokawa et al. ............ 65/385 |
| 5,833,871 A | * | 11/1998 | Matsushita et al. ............ 216/22 |
| 5,846,628 A | * | 12/1998 | Kuroe et al. ................. 428/65.3 |
| 5,849,597 A | * | 12/1998 | Tokuoka et al. ............. 436/175 |
| 6,048,466 A | * | 4/2000 | Morizane et al. .............. 216/24 |
| 6,119,483 A | * | 9/2000 | Takahashi et al. .......... 65/30.14 |
| 6,134,918 A | * | 10/2000 | Eto et al. .................... 65/30.14 |

FOREIGN PATENT DOCUMENTS

| | | | |
|---|---|---|---|
| EP | 0 788 093 A1 | 8/1997 | |
| EP | 0 810 586 A1 | 12/1997 | |
| JP | 60-229234 | 11/1985 | |
| JP | 62-026623 | 2/1987 | |
| JP | 62256215 A | * 11/1987 | ............ G11B/5/62 |
| JP | 62-273619 | 11/1987 | |
| JP | 4-62413 | 10/1992 | |
| JP | 405314471 A | * 11/1993 | ............ G11B/5/82 |
| JP | 7-101507 | 11/1995 | |
| JP | 8-111024 | 4/1996 | |
| JP | 09-124343 | 5/1997 | |
| JP | 10-79121 | 3/1998 | |
| JP | 63225919 A | * 9/1998 | ............ G11B/5/82 |
| JP | 2000-053450 | 2/2000 | |

* cited by examiner

Primary Examiner—Randy Gulakowski
Assistant Examiner—Jiri Smetana
(74) Attorney, Agent, or Firm—Sughrue Mion, PLLC

(57) ABSTRACT

In a glass substrate for use in a magnetic recording medium, a surface roughness of at least a principal surface of the glass substrate is measured by the use of the interatomic force microscope (AFM), Ra falls within the range between 0.2 and 2.5 nm, Rmax falls within the range between 3 and 25 nm, and Rmax/Ra falls within the range between 3 and 35.

18 Claims, 5 Drawing Sheets

US 6,383,404 B1

GLASS SUBSTRATE FOR MAGNETIC RECORDING MEDIUM, MAGNETIC RECORDING MEDIUM, AND METHOD OF MANUFACTURING THE SAME

BACKGROUND OF THE INVENTION

This invention relates to a glass substrate for use in a magnetic recording medium, such as, a hard disk, a magnetic recording medium having the glass substrate, and a method of manufacturing the magnetic recording medium and the glass substrate.

An interface between a magnetic head and a magnetic disk has become a key technology for improving recording capacity in a technical field for magnetically recording (writing) and reproducing (reading).

It is necessary to excessively reduce a flying height of the magnetic head which is float over a surface of the magnetic disk to improve recording density.

However, when the record/reproduce (write/read) operation is carried out in the known CSS (Contact Start Stop) method, the magnetic head often sticks to the magnetic disk with a low flying height of the magnetic head. Herein, it is to be noted that this phenomenon is generally called "head stiction".

Suggestions conventionally have been made about a variety of texture techniques to prevent such stiction of the magnetic head. A representative suggestion has been made about a method of forming a surface of an Al/NiP plating substrate into a rough surface by mechanically polishing (mechanically texturing) the surface in Japanese Unexamined Patent Publication (JP-A) No. Sho. 62-273619.

Further, another suggestion has been made about a method of depositing a thin-film having the rough surface on a glass substrate by the use of the known sputtering process in Japanese Examined Patent Publication (JP-B) No. Hei. 4-62413 or a method of forming the rough surface by the use of the chemical etching process in Japanese Examined Patent Publication (JP-B) No. Hei. 7-101507 when the glass substrate is superior in flatness in comparison with an aluminum substrate.

In the meanwhile, a glide height recently has reached $1.2\mu$ inch or less to improve the recording capacity.

However, the method of forming the texture, which has been conventionally suggested and described above, is the texture technique on the condition that the glide height is equal to about $8\mu$ inch.

Therefore, even when the conventional texture forming method is applied for the recent magnetic disk which records (writes) and reproduces (reads) with the low flying height, it is difficult to obtain the magnetic disk which simultaneously satisfies sufficient electro-magnetic conversion characteristic and stiction preventing effect of the magnetic head.

In this case, the conventional glide height was equal to about $8\mu$ inch. Therefore, the surface state (the surface morphology) of the magnetic disk (the substrate) could be sufficiently evaluated by the known thally step. Herein, the surface roughness is measured by scanning a contact needle having radius of several $\mu$m (for example, 2.5 $\mu$m) along the surface.

However, when the flying height becomes $1.2\mu$ inch or less (1 inch=25.4 mm) which is recently required, it is difficult to judge whether or not the surface state of the glass substrate can realize prevention of the stiction of the magnetic head by the use of the conventional thally step.

SUMMARY OF THE INVENTION

It is therefore an object of this invention to provide a magnetic recording medium and a glass substrate for the magnetic recording medium which has a glide height of $1.2\mu$ inch or less and which is capable of realizing high electro-magnetic characteristic (high memory performance) and high CSS durability characteristic.

Inventors have paid attention to specify the surface state of the glass substrate by the use of the interatomic force microscope (AFM) in order to evaluate the surface state of the glass substrate. This is because it is impossible to identify whether or not the surface state of the glass substrate is suitable, since the resolution is low in the conventional measuring method using the contact needle method.

Based upon the above-mentioned evaluation method, it has been confirmed that height and distribution (namely, variation of the height) of each projection of fine roughness, which are formed on a principle surface of the glass substrate, are important factors to achieve the above purpose.

Further, as a result of various experiments, it has been found out that the glass substrate surface as a target or a goal can not be obtained unless specific polishing condition and surface process condition are properly combined. This invention is performed base upon this analyzed result.

(First invention)

In the glass substrate for use in the magnetic recording medium according to the first invention, when the surface roughness of at least the principal surface of the glass substrate is measured by the use of the interatomic force microscope (AFM), Ra (center-line mean roughness) falls within the range between 0.2 and 2.5 nm, Rmax (maximum height) falls within the range between 3 and 25 nm, and Rmax/Ra falls within the range between 3 and 35.

(Second invention)

In the glass substrate according to the first invention, a surface parallel to a virtual principal surface is defined as a contour surface when it is assumed that the principal surface of the glass substrate is completely flattened, when the roughness formed on the principal surface is cut by the use of the contour surface (a surface which is structured by the same height components), a percentage rate of a total area of the principal surface for sum of areas of the cut cross sectional surface is defined as a bearing ratio, the contour surface having the bearing ratio of 50% is defined as a referential surface, each distance from the referential surface to each contour surface having each bearing ratio is specified as a bearing height, the bearing height of the contour surface having the bearing ratio of 2.5% is defined as B.H. (2.5) while the bearing height of the contour surface having the bearing ratio of 5.0% is defined as B.H. (5.0), and B.H. (2.5)/Rmax falls within the range between 0.1 and 0.5 or B.H. (5.0)/Rmax falls within the range between 0.1 and 0.45.

(Third invention)

In the glass substrate according to the first invention, the surface roughness of at least the principal surface is measured by the use of the interatomic force microscope (AFM), Rmax falls within the range between 5 and 25 nm, and B.H. (2.5)/Rmax fall within the range between 0.1 and 0.5 or B.H. (5.0)/Rmax falls within the range between 0.1 and 0.45.

(Fourth invention)

In the glass substrate according to any one of the first through the third inventions, the glass substrate contains at least alkali metal oxide and alkali earth oxide, and the content of alkali earth oxide is not exceeding 3 mol %.
(Fifth invention)

In the glass substrate according to any one of the first through the fourth inventions, the glass substrate is used for a magnetic disk which has a glide height having $1.2\mu$ inch or less.
(Sixth invention)

In a magnetic recording medium according to the fifth invention, at least a magnetic layer is formed on the principal surface of the glass substrate of any one of the first through the fifth inventions.
(Seventh invention)

A method of manufacturing a glass substrate which is for use in a magnetic recording medium, comprising the steps of:

preparing a glass member in which Ra falls within the range between 0.1 and 1.0 nm when a surface roughness of a principal surface of the glass member is measured by the use of the interatomic force microscope (AFM), and chemically processing the surface so that Ra falls within the range between 0.2 and 2.5 nm, Rmax falls within the range between 3 and 25 nm, and Rmax/Ra falls within the range between 3 and 35.

(Eighth invention)

A method of manufacturing a glass substrate which is for use in a magnetic recording medium, comprising the steps of:

preparing a glass member in which Ra falls within the range between 0.1 and 1.0 nm when a surface roughness of a principal surface of said glass member is measured by the use of the interatomic force microscope (AFM), and processing at least the principle surface by the use of hydrofluosilic acid.

(Ninth invention)

A method according to the seventh or the eighth invention, further comprising the steps of:

polishing at least the principal surface by the use of abrasive materiel containing free abrasive grain having grain diameter between 0.3 and 3.0 $\mu$m before the chemical surface process or the surface process due to the hydrofluosilic acid.

(Tenth invention)

In a method according to the ninth invention, the chemical surface process or the surface process due to the hydrofluosilic acid processes the surface so that a portion having relatively high remaining distortion forms an island or peak in remaining stress distribution which is generated at a portion of abrasive trace due to the abrasive grain in the polishing step of the glass member.

(Eleventh invention)

In a method according to any one of the eighth through the tenth inventions, the hydrofluosilic acid has concentration between 0.15 and 3.0 by weight %.

(Twelfth invention)

In a method according to any one of seventh through ninth inventions, the glass constituting the glass member contains at least alkali metal oxide and alkali earth oxide, and content of the alkali earth oxide is not exceeding 3 mol %.

(Thirteenth invention)

In a method according to the twelfth invention, the glass constituting the glass member contains $SiO_2$ between 58 and 75 weight %, $Al_2O_3$ between 5 and 23 weight %, $Li_2O$ between 3 and 10 weight %, and $Na_2O$ between 4 and 13 weight % as main components.

(Fourteenth invention)

In a method according to the thirteenth invention, the glass contains $SiO_2$ between 62 and 75 weight %, $Al_2O_3$ between 5 and 15 weight %, $Li_2O$ between 4 and 10 weight %, $Na_2O$ between 4 and 12 weight %, and $ZrO_2$ between 5.5 and 15 weight % as main components, and weight ratio of $Na_2O/ZrO_2$ falls within the range between 0.5 and 2.0 while weight ratio of $Al_2O_3/ZrO_2$ falls within the range between 0.4 and 2.5.

(Fifteenth invention)

In a method according to any one of seventh through fourteenth inventions, the step of chemically processing the surface or a chemical reinforcement process (chemical strengthening process) is carried out after the surface process due to the hydrofluosilic acid.

(Sixteenth invention)

In a method of manufacturing a magnetic recording medium according to the sixteenth invention, at least a magnetic layer is formed on the principal surface of the glass substrate manufactured by the method according to any one of the seventh through the fifteenth inventions.

(Seventeenth invention)

A method of manufacturing a glass substrate for use in a magnetic recording medium, comprising the steps of:

specifying a surface state of said glass substrate to improve flying characteristic of a magnetic head at every kinds of the magnetic head within a specific range Ra, Rmax and Rmax/Ra measured by the use of the interatomic force microscope (AFM);

processing the surface of the glass substrate under various surface processing conditions;

determining the surface processing condition so that Ra, Rmax and Rmax/Ra measured by the use of the interatomic force microscope (AFM) after the process falls within the specific range; and processing the surface of the glass substrate based upon the determined surface processing condition.

According to the first invention, when the surface roughness of at least the principal surface of the glass substrate are measured by the use of the AFM, Ra falls within the range between 0.2 and 2.5 nm, Rmax falls within the range between 3 and 25 nm, and Rmax/Ra falls within the range between 3 and 35.

Thereby, the glass substrate for the magnetic recording medium, such as, the magnetic disk has the glide height $1.2\mu$ inch or less without the stiction of the magnetic head.

Further, the glass substrate satisfies further high CSS durability characteristic in the magnetic disk using the CSS method.

Herein, it is to be noted that Ra and Rmax are center-line mean roughness and maximum height specified by JIS B0601, respectively.

The value of Rmax measured by the AFM represents the maximum height of the roughness formed on the substrate surface. When Rmax is not exceeding 5 nm, the substrate surface substantially becomes the mirror surface. This is not preferable because the magnetic head is stuck to the surface of the magnetic disk. When the Rmax exceeds 25 nm, the glide height exceeds $1.2\mu$ inch. This is not also desirable.

The ratio of Rmax/Ra measured by the AFM represents distribution (variation (uniformity)) regarding height of the island (the peaks) in the roughness on the substrate surface and changes the coefficient of friction. Therefore, this ratio is an important factor.

Inventors have found out that the variation regarding the height of the island (peaks) of the roughness has a proper range to keep the glide height of 1.2μ inch or less and to realize the high CSS durability characteristic.

When Rmax/Ra which represents the height distribution (variation) of the peaks is not exceeding 5, the roughness relatively becomes uniform, the static coefficient of friction exceeds 3, and contacting area with the magnetic head is increased to readily occur the stiction. This is not preferable because the CSS durability characteristic is degraded.

Further, when Rmax/Ra exceeds 35, the maximum height of the peaks for the total average surface roughness becomes large. Thereby, the static coefficient of friction becomes 1 or less.

Although the contacting area with the magnetic head is reduced, a load for the maximum peak becomes large. This is not desirable because the head crash occurs.

The record/reproduce (write/read) method of the magnetic disk comprises the CSS method and the load-unload (namely, lamp load) method. For example, the surface roughness is controlled within the range specified by Ra=0.7~1.6 nm, and Rmax=8~18 nm, Rmax/Ra=10~20 in the CSS method.

On the other hand, the surface roughness is specifically controlled within the range specified by Ra=0.2~2.5 nm, Rmax=3~10 nm, and Rmax/Ra=3~15 in the load-unload method.

As mentioned before, Rmax/Ra is a parameter which indicates the distribution (variation (uniformity)) of the island (peak) of the roughness on the substrate surface. It is certain to be able to obtain the magnetic disk which has the glide height of 1.2μ inch or less and which satisfies the high CSS durability characteristic by selecting the predetermined range.

However, the projection (peak) on the surface of the magnetic disk, which directly contacts with the magnetic head, is practically a high projection (peak) corresponding to Rmax which is the maximum projection(peak) height among the roughness on the substrate surface. To control ratio (distribution) of the high projections (peaks) is important to realize further low flying height and obtain the high CSS durability characteristic.

Therefore, the ratio of B.H./Rmax as the parameter, which represents the ratio of the high projection (peaks) corresponding to Rmax, becomes excessively important.

According to the second and third inventions, the contour surface having the bearing ratio of 50% is defined as the referential surface, and the height from the referential surface is specified as the bearing height. Herein, it is to be note that the contour surface means a surface which is structured by the same height components.

When the bearing height of the contour surface having the bearing ratio of 2.5% is defined as B.H. (2.5) while the bearing height of the contour surface having the bearing ratio of 5.0% is defined as B.H. (5.0).

In this event, B.H. (2.5)/Rmax falls within the range between 0.1 and 0.5 or B.H. (5.0)/Rmax falls within the range between 0.1 and 0.45. This is preferable because the low flying height is further realized and the high CSS durability characteristic is obtained.

Herein, description will be made about the bearing ratio and the bearing height.

In the roughness picture illustrated in FIG. 1, the surface roughness on the principle surface of the glass substrate obtained according to this invention were measured by the use of the interatomic force microscope (AFM).

Further, the surface roughness on a specific linear line on the surface illustrated in FIG. 1 is represented in the measuring curve illustrated in FIG. 2.

Now, when it is assumed that the principal surface of the glass substrate is completely flattened, the virtual principal surface is defined and the surface parallel to the virtual principal surface is defined as the contour surface.

The contour surface, in which the distance from the virtual principal surface falls within the predetermined range, cuts roughness formed on the principal surface of the glass substrate.

A percentage rate of a total area of the virtual principal surface for sum of areas of the cut cross sectional surface of the all roughness cut by the contour surface is defined as the bearing ratio.

Further, the contour surface having the bearing ratio of 50% is defined as the referential surface and each distance from the referential surface to the contour surface having each bearing ratio is specified as the bearing height.

In this event, the above-mentioned bearing ratio is plotted in the abscissa axis, and the vertical distance from the maximum point of the contour surface, namely depth (bearing depth) is plotted in the vertical axis. This is called as the bearing curve.

In FIG. 3, the bearing curve of the surface roughness illustrated in FIG. 1 is illustrated. Herein, the contour surface, which is laid in the depth having the bearing ratio of 50%, is defined as the referential surface.

Further, the bearing height having the bearing ratio of 2.5% is defined as B.H. (2.5) while the bearing height having the bearing ratio of 5.0% is defined as B.H. (5.0).

In this case, when B.H. (2.5)/Rmax falls within the range between 0.1 and 0.5 or B.H. (5.0)/Rmax falls within the range between 0.1 and 0.45, it has been found out to realize further low flying height and obtain the high CSS durability characteristic.

The ratio of B.H./Rmax measured by the AFM relatively represents the rate (distribution) between the height in one bearing value and the maximum projection height, and deeply relates with the projection density.

The inventors have found out as a result of a variety of experiments that the value of the B.H./Rmax in the bearing ratio of 2.5% and 5% closely relates with the CSS durability and the static coefficient of friction. Namely, when B.H. (2.5)/Rmax and B.H. (5.0)/Rmax are not exceeding 0.1, respectively, the coefficient of friction due to sliding is increased and the CSS durability is lowered.

Further, when the B.H. (2.5)/Rmax and B.H. (5.0)/Rmax exceeds 0.5 and 0.45, respectively, the coefficient of friction exceeds 3. This is not preferable.

In this case, the surface having the bearing ration of 50% in the bearing curve is defined as the referential surface. However, this defines the referential surface of the bearing height, and the value of the arbitrary bearing ratio in the bearing curve may be adopted as the referential surface.

However, when the bearing ratio is 50%, it is preferable because the referential surface is a central surface between the island (peaks) and the concave portion in the roughness on the principal surface of the glass substrate.

Further, the value of the bearing height (B.H.) is selected to the bearing ratio 2.5% and 5% from the following reason. Namely, the density ratio of the island (peak), which has the height corresponding to the maximum surface roughness that contacts with the magnetic head in the corresponding relationship with the low flying height required for the magnetic disk, the low coefficient of friction and the high CSS durability, can precisely identified.

In Table 1, a plurality of (four) magnetic disks, which had the predetermined density of the island (peaks) measured by the use of the AFM, were prepared. Herein, the number of the islands (peaks) was 380 in the disk A, 96 in the disk B, 64 in the disk C, and 0 in the disk C when the disk was sliced with 6 nm from the center line of the surface roughness. In this condition, B.H./Rmax was calculated when the bearing ratio was set to 0.025%, 0.25%, 2.5%, and 25%, respectively. Table 1 represents the calculated results.

TABLE 1

|        | B.H. (0.025%)/ Rmax | B.H. (0.25%)/ Rmax | B.H. (2.5%)/ Rmax | B.H. (5.0%)/ Rmax | B.H. (25%)/ Rmax |
|--------|---------------------|--------------------|--------------------|--------------------|-------------------|
| Disk A | 0.64                | 0.58               | 0.43               | 0.38               | 0.15              |
| Disk B | 0.62                | 0.53               | 0.26               | 0.18               | 0.04              |
| Disk C | 0.67                | 0.61               | 0.21               | 0.13               | 0.03              |
| Disk D | 0.58                | 0.39               | 0.18               | 0.11               | 0.01              |

B.H./Rmax in Table 1 relatively represents the ratio of the island (peaks). However, when the bearing ratio was set to 0.025% and 0.25%, the relationship of the disk A> the disk B> the disk C> the disk C must be naturally satisfied proportional to the density of the islands (peaks). However, the value of B.H./Rmax of the disk C becomes large in comparison with the disk A or the disk B.

This is because the rate of the number of the abnormal projections (peaks), which does not relate with the glide characteristic, is contained much, since the bearing ratio is considered as the relatively small value, namely, as only excessively small region of the islands (peaks). Therefore, it is not preferable in this case because the rate of the islands (peaks) can not be identified.

When the bearing ratio is 25%, the rate of the density of the islands (peaks) can be identified. However, it is not desirable because the range of B.H./Rmax between the respective disks is small.

The above-mentioned results are briefly explained as follows, and the second invention and the third invention depend upon these results.

(1) The bearing curve of the surface roughness of the substrate is determined, and the referential surface as the reference of the bearing height is defined. In the second invention and the third invention, the depth having the bearing ratio of 50% is selected as the reference.

(2) The bearing ratio is selected so that the specific parameter, in which the bearing height B.H. and the rate of Rmax measured from the referential surface determined from the above-mentioned (1) indicates the characteristic required for the magnetic disk or the state of the surface roughness in the corresponding relationship with this characteristic, can be precisely identified by the value of B.H./Rmax.

In the second invention and the third invention, the bearing ratio value (2.5%, 5.0%) is selected so that the rate of the islands (peaks) on the substrate surface in the corresponding relationship with the glide height, the coefficient of friction, and the CSS durability as the characteristic required for the magnetic disk can be precisely identified.

(3) The range of B.H./Rmax which satisfies the characteristic required for the magnetic disk is determined for the bearing ratio selected by the above-mentioned (2).

In the second invention and the third invention, the glide height is $1.2\mu$ inch or less, the coefficient of friction is 3 or less, and B.H. (2.5)/Rmax which satisfies the excellent CSS durability falls within the range between 0.1 and 0.5 or B.H. (5.0)/Rmax falls within the range between 0.1 and 0.45.

The glass substrate for the magnetic disk manufactured by the method of controlling the surface roughness is useful for the magnetic disk in which it is necessary to strictly control the surface roughness of the substrate to achieve further flying height of the magnetic head.

According to the fourth invention, the above-mentioned glass substrate contains at least alkali metal oxide and alkali earth oxide, and content of the alkali earth oxide is not exceeding 3 mol %. Thereby, the desired surface roughness mentioned in the first through third inventions can be readily obtained by the chemical surface process (hydrofluosilic acid process) which will be described later.

According to the fifth invention, the magnetic disk, which is recorded (written) and reproduced (read) with the glide height of $1.2\mu$ inch or less, is used. Thereby, the effect is maximized in the high recording density and the high CSS durability.

According to the sixth invention, at least magnetic layer is formed on the principal surface of the above-mentioned glass substrate. Consequently, the magnetic disk satisfies the high electro-magnetic conversion characteristic and the high CSS durability characteristic.

According to the seventh invention, the glass member, in which Ra falls within the range between 0.1 and 1.0 nm when the surface roughness of the principal surface is measured by AFM, is prepared. The surface roughness of at least the principal surface of the glass member is chemically surface-processed so that Ra falls within the range between 0.2 and 2.5 nm, Rmax falls within the range between 3 and 25 nm, and Rmax/Ra falls within the range between 3 and 35.

Thereby, the glass substrate for the magnetic disk, which satisfies the high CSS durability, can be stably manufactured.

According to the eighth invention, the glass member, in which Ra falls within the range between 0.1 and 1.0 nm when the surface roughness of the principal surface is measured by the AFM, is prepared. At least the principal surface of the glass member is processed the surface by the use of hydrofluosilic acid.

Thereby, the glass substrate for the magnetic disk, which satisfies the high CSS durability, can be stably manufactured. The surface roughness of the glass substrate before the surface process must be set to the desired roughness (Ra= 0.1~1.0 nm) and chemical material for processing the surface must be selected to the hydrofluosilic acid in order to stably manufacture the glass substrate for the magnetic disk which satisfies the high CSS durability.

Inventors have found out that the surface roughness of the glass substrate before the surface process gives large effect for the height distribution (variation) of the islands (peaks) on the substrate surface which is finally obtained to stably manufacture the glass substrate for the magnetic disk of this invention which is required to be controlled the surface roughness with high accuracy.

Inventors have enthusiastically researched this case. As a result, it is preferable that the surface of the glass substrate before the surface process is in the mirror state. Specifically, it is found out that Ra falls within the range between 0.1 and 1.0 nm, more preferably, that Ra falls within the range between 0.1 and 1.0 nm, and the Rmax falls within the range between 1 and 20 nm.

Further, the hydrofluosilic acid used during processing the surface of the glass substrate of the this invention has weak etching force (slow etching rate) as compared to hydrofluoric acid solution which contains hydrofluoric acid or potassium fluoride and which is conventionally used as the etching liquid.

Consequently, it is possible to precisely control the surface roughness. Silicofluoric acid ($H_2SiF_6$) is typically used as the hydrofluosilic acid.

The hydrofluosilic acid process may contain the other acid (hydrofluoric acid, sulfuric acid, hydrochloric acid, nitric acid) and commercially available washing materiel (natural washing material, surfactant, alkali washing material) with fine quantity in order to enhance the etching (washing) effect.

Further, the process condition of the hydrofluosilic acid is mainly determined in dependency upon concentration of the hydrofluosilic acid, immersing time into the hydrofluosilic acid, temperature of the hydrofluosilic acid.

The hydrofluosilic acid is formed by dissolving the silicofluoric acid into water. The concentration of the hydrofluosilic acid indicates the concentration in which the silicofluoric acid is dissolved in the water.

The concentration and the temperature of the hydrofluosilic acid relate with the etching rate (the specific range will be explained later) while the immersing time into the hydrofluosilic acid relates with the obtained roughness and the process time of the step.

These process conditions of the hydrofluosilic acid mainly relates with the surface roughness Rmax. Specifically, the surface roughness Rmax becomes larger as the concentration of the hydrofluosilic acid is higher, the immersing time into the hydrofluosilic acid is longer, and the temperature of the hydrofluosilic acid is higher.

The process condition of the above-mentioned hydrofluosilic acid is suitably adjusted based upon the roughness of the formed surface roughness. However, it is preferable from controllability of the surface roughness that the immersing time into the hydrofluosilic acid falls within the range between 50 and 600 sec and the temperature of the hydrofluosilic acid falls within the range between 15° C. and 60° C.

According to the ninth invention, the glass member before the above surface process is polished at least the principal surface by the use of the polishing material containing the free abrasive grain having grain diameter between 0.3 and 3.0 $\mu$m.

The grain diameter mainly relates with the surface roughness Ra. Namely, when the average grain diameter of the abrasive grain becomes large, the surface roughness Ra of the glass substrate after the hydrofluosilic acid process becomes large (however, the surface roughness Rmax is not almost changed in this time).

Preferable density of the island (peaks) and tip shape of the island (peak) contacting with the magnetic disk can be obtained by setting the grain diameter within the range between 0.3 and 3.0 $\mu$m.

In consequence, the glass substrate for the magnetic disk has further high CSS durability characteristic.

When the grain diameter of the free abrasive grain is not exceeding 0.3 $\mu$m, aggregation of the polishing material readily occurs, and further, much residue generates after the washing step. This is not preferable. When the grain diameter exceeds 3.0 $\mu$m, the roughness after the etching becomes excessively large. This is also undesirable.

Moreover, cerium oxide ($CeO_2$), alumina ($Al_2O_3$), colloidal silica ($SiO_2$), iron oxide ($Fe_2O_3$), chromium oxide ($Cr_2O_3$), zirconium oxide ($ZrO_2$), titanium oxide ($TiO_2$) are exemplified as the free abrasive grain.

According to the tenth invention, the chemical surface process or the surface process due to the hydrofluosilic acid processes the surface so that the portion having relatively high remaining distortion becomes the island (peak) in remaining stress distribution which is generated at the portion of abrasive trace due to the abrasive grain in the polishing step of the glass member.

Inventors have discovered that the trace, along which the abrasive grain passes, tends to be formed as the island (peak) when the surface is processed by the hydrofluosilic acid after polishing by the polishing material containing the free abrasive grain.

Although this mechanism is not clear, the load in the polishing step by the free abrasive grain is applied to the surface of the glass substrate. Consequently, the network of Si—O is (systematically and) structurally changed, and nonuniformity occurs in the remaining stress distribution by the structural change.

As a result, the etching rate due to the hydrofluosilic acid becomes slow in the portion having relatively high remaining distortion. This is assumed to be the above-mentioned mechanism.

In the eighth through the tenth inventions, the above-mentioned phenonmenon due to the discovery is positively utilized. Thereby, the desired surface roughness state can be firstly obtained.

The concentration of the hydrofluosilic acid preferably falls within the range between 0.15 and 3.0 weight (the eleventh invention).

When the concentration of the hydrofluosilic acid is not exceeding 0.15 weight %, the etching effect or the washing effect for the glass substrate is lowered. Consequently, the desired surface roughness can not be obtained.

When the concentration exceeds 3.0 weight %, it is difficult to control the surface roughness with high accuracy because the etching rate became quick. Consequently, the glass substrate for the magnetic recording medium having stable quality can not be obtained. This is not preferable.

If the projection (peaks) is formed in the first through the third inventions, no limitation is imposed as to a kind, a size and a thickness of the glass substrate used in this invention.

As the material of the glass substrate, aluminosilicate glass, soda-lime glass, soda aluminosilicate glass, aluminoborosilicate glass, borosilicate glass, and silicate glass are exemplified. The hydrofluosilic acid has excellent controllability of the chemical etching for the aluminosilicate glass, and the surface roughness can be controlled with high accuracy.

Further, the glass substrate (the glass substrate for forming the island (peaks) by the mechanism in the tenth invention) used in the manufacturing method of this invention is preferably formed by the material which contains the alkali metal oxide and in which the total content of the alkali earth oxide (RO:MgO, CaO and the like) is not exceeding 3 mol % (the twelfth invention).

The composition ratio is preferably specified by 58~75 weight % of $SiO_2$, 5~23 weight % of $Al_2O_3$, 3~10 weight % of $Li_2O$ and 4~13 weight % of $Na_2O$ as main components (the thirteenth invention).

Further, it is desirable that the glass does not contain alkali earth (metal) oxide, such as, CaO or MgO to remarkably form the island (peak) by the mechanism in the tenth invention.

In particular, it is preferable in the fourteenth invention that the glass substrate is an aluminosilicate glass which contains 62~75 weight % of $SiO_2$, 5~15 weight % of $Al_2O_3$, 4~10 weight % of $Li_2O$, 4~12 weight % of $Na_2O$, and 5.5~15 weight % of $ZrO_2$ as the main components, the weight ratio of $Na_2O/ZrO_2$ falls within the range between 0.5 and 2.0, and the weight ratio of $Al_2O_3/ZrO_2$ falls within the range between 0.4 and 2.5.

The transverse bending strength is increased, the compressive stress layer becomes deep, the Knoop hardness is excellent, and the controllability of the etching in the surface process due to the hydrofluosilic acid is excessively superior by chemically reinforcing (chemically strengthening) the aluminosilicate glass.

Therefore, such an aluminosilicate glass is desirable. Herein, it is to be noted that N5 manufactured by HOYA CORPORATION is representative of the above-mentioned aluminosilicate glass.

Further, the surface process due to the above hydrofluosilic acid is performed twice. Moreover, the different hydrofluosilic acid concentrations are used in the respective steps. Thereby, the fine surface roughness on the substrate surface can be controlled.

It is preferable that the chemical reinforcement (chemical strengthening) process is carried out after chemical surface process or the surface process due to the hydrofluosilic acid (the thirteenth invention). Herein, the known chemical reinforcement (chemical strengthening) methods are used as the above chemical reinforcement (chemical strengthening) method without limitation.

For example, the low-temperature ion exchange method, in which the ion exchange is performed in the region which does not exceed the transition point temperature from the viewpoint of the glass transition point, is preferable. A fused salt used for the chemical reinforcement (chemical strengthening) includes potassium nitrate, sodium nitrate, nitrate mixed with them.

When the above surface process due to the hydrofluosilic acid is performed immediately after the glass substrate surface is chemically reinforced (chemically strengthened), the remaining distortion formed by the free abrasive grains on the glass substrate surface is buried in the stress of the chemical reinforcement by chemically reinforcing (chemically strengthening). This is undesirable because the surface roughness can not be controlled.

However, the same result as the above-mentioned case can be obtained by the interposing the polishing processing step due to the free abrasive grains between (immediately after the surface process due to the hydrofluosilic acid) the chemical reinforcement process step (chemical strengthening process step) and the surface process due to the hydrofluosilic acid as the chemical reinforcement step (chemical strengthening process step)→the polishing step due to the free abrasive grains→the surface process due to the hydrofluosilic acid.

According to the sixteenth invention, at least the magnetic layer is formed on the principal surface of the glass substrate manufactured by the method of manufacturing the glass substrate for the magnetic recording medium, such as, the above-mentioned magnetic disk.

Thereby, the magnetic recording medium, such as, the magnetic disk satisfies the high electro-magnetic conversion characteristic and the high CSS durability characteristic.

According to the seventeenth invention, the surface roughness of the principal surface of the glass substrate is controlled so that Ra, Rmax which indicate the height of the roughness measured by the interatomic force microscope (AFM), Rmax/Ra which indicates the height distribution of the roughness.

In consequence, the glass substrate for the magnetic recording medium used for the magnetic disk, satisfies the high electro-magnetic conversion characteristic and the high CSS durability characteristic.

Alternatively, the surface roughness of the principal surface of the glass substrate is controlled so that the ratio (B.H./Rmax) between the bearing height (B.H.) of the contour surface and Rmax, or Ra, Rmax, Rmax/Ra, B.H./Rmax fall within the specific range, as described in the following structures (a) and (b). In the above contour surface, the bearing ratio, which indicates the rate (the distribution) of the projection having the height corresponding to the maximum projection height, has the specific value.

Thereby, the glass substrate for the magnetic recording medium used for the magnetic disk, also satisfies the high electro-magnetic conversion characteristic and the high CSS durability characteristic.

(a) A method of manufacturing a glass substrate which is for use in a magnetic recording medium and which has surface roughness Ra and Rmax, where Ra is representative of a center-line mean roughness, Rmax is defined as a maximum height representative of a difference between a highest point and a lowest point, a surface parallel to a virtual principal surface is defined as a contour surface when it is assumed that the principal surface of the glass substrate is completely flattened, when roughness formed on the principal surface of the glass substrate are cut by the use of the contour surface, a percentage rate of a total area of the principal surface for sum of areas of the cut cross sectional surface is defined as a bearing ratio, the contour surface having the bearing ration of 50% is defined as a referential surface, and each distance from the referential surface to each contour surface having each bearing ratio is specified as a bearing height (B.H.), comprising the steps of:

specifying a surface state of the glass substrate to improve flying characteristic of a magnetic head at every kinds of the magnetic head within a specific range ratio (B.H./Rmax) of the bearing height (B.H.) and Rmax measured by the use of the interatomic force microscope (AFM);

processing the surface of the glass substrate under various surface processing conditions;

determining the surface processing condition so that B.H./Rmax measured by the use of the interatomic force microscope (AFM) after the process falls within the specific range; and processing the surface of the glass substrate based upon the determined surface processing condition.

(b) A method of manufacturing a glass substrate which is for use in a magnetic recording medium and which has surface roughness Ra and Rmax, where Ra is representative of a center-line mean roughness, Rmax is defined as a maximum height representative of a difference between a highest point and a lowest point, a surface parallel to a virtual principal surface is defined as a contour surface when it is assumed that the principal surface of the glass substrate is completely flattened, when roughness formed on the principal surface of the glass substrate are cut by the use of the contour surface, a percentage rate of a total area of the principal surface for sum of areas of the cut cross sectional surface is defined as a bearing ratio, the contour surface having the bearing ration of 50% is defined as a referential surface, and each distance from the referential surface to each contour surface having each bearing ratio is specified as a bearing height (B.H.), comprising the steps of:

specifying a surface state of the glass substrate to improve flying characteristic of a magnetic head at every kinds of the magnetic head within Ra, Rmax, Rmax/Ra, and a specific range ratio (B.H./Rmax) of the bearing height (B.H.) and Rmax measured by the use of the interatomic force microscope (AFM);

processing the surface of the glass substrate under various surface processing conditions;

determining the surface processing condition so that Ra, Rmax, Rmax/Ra, and B.H./Rmax measured by the use of the interatomic force microscope (AFM) after the process falls within the specific range; and processing the surface of the glass substrate based upon the determined surface processing condition.

DESCRIPTION OF THE PREFERRED EMBODIMENTS

EXAMPLE 1

Figure 1:
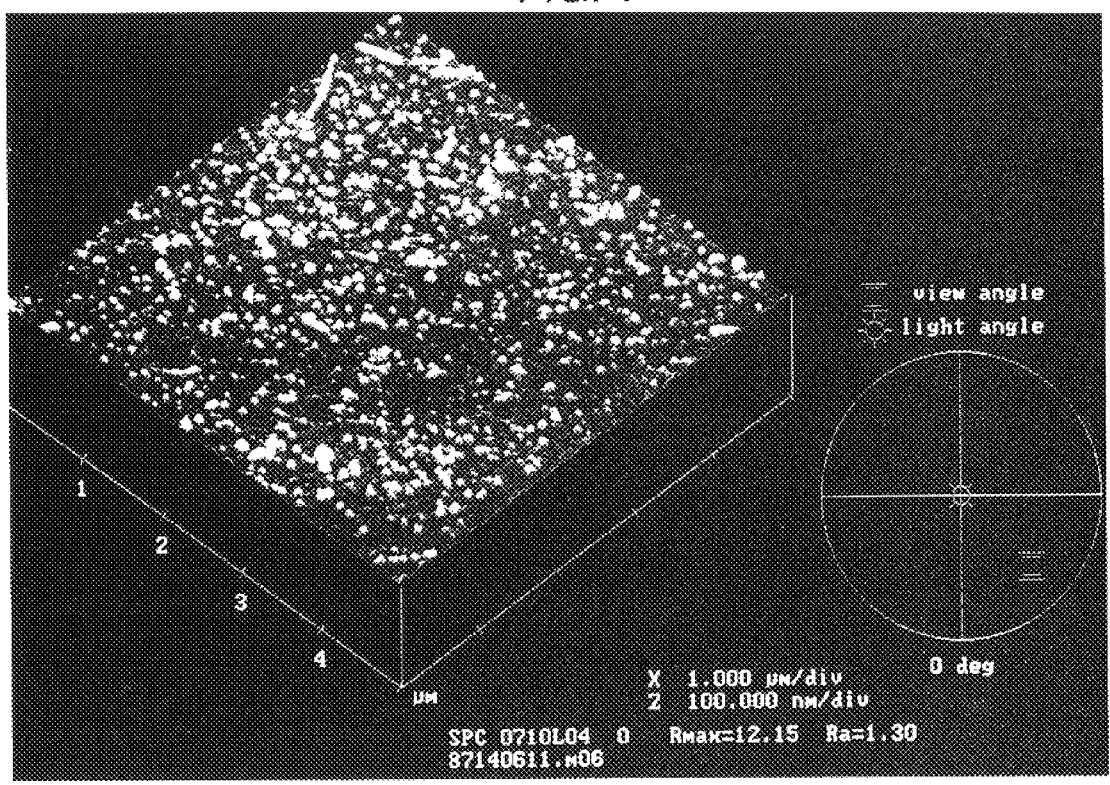
FIG. 1 is a measuring picture of a principal surface of a glass substrate for a magnetic recording medium measured the interatomic force microscope (AFM) according to this invention.
Figure 2:
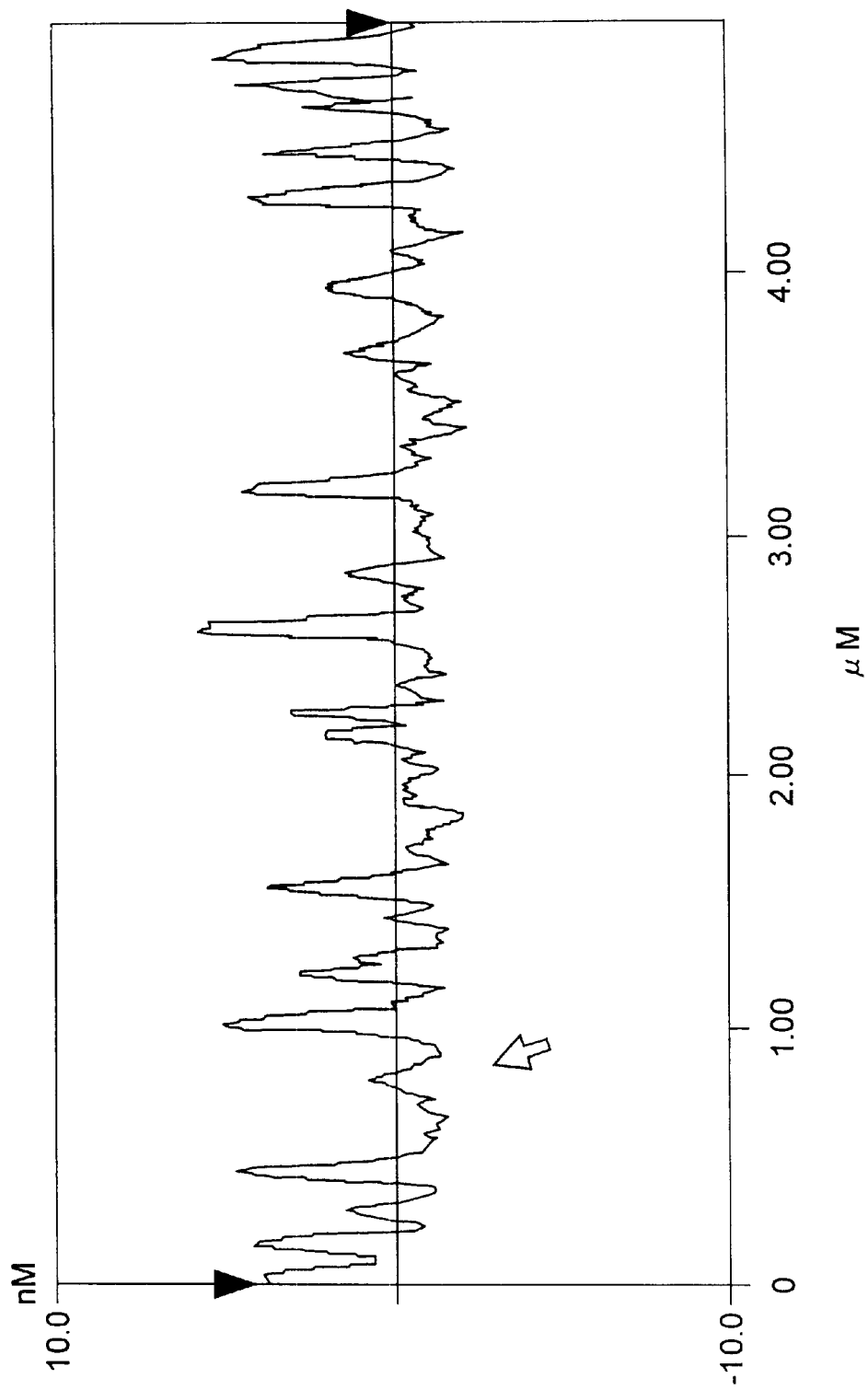
FIG. 2 is a measuring curve of surface roughness along a specific leaner line on a surface illustrated in FIG. 1.
Figure 3:
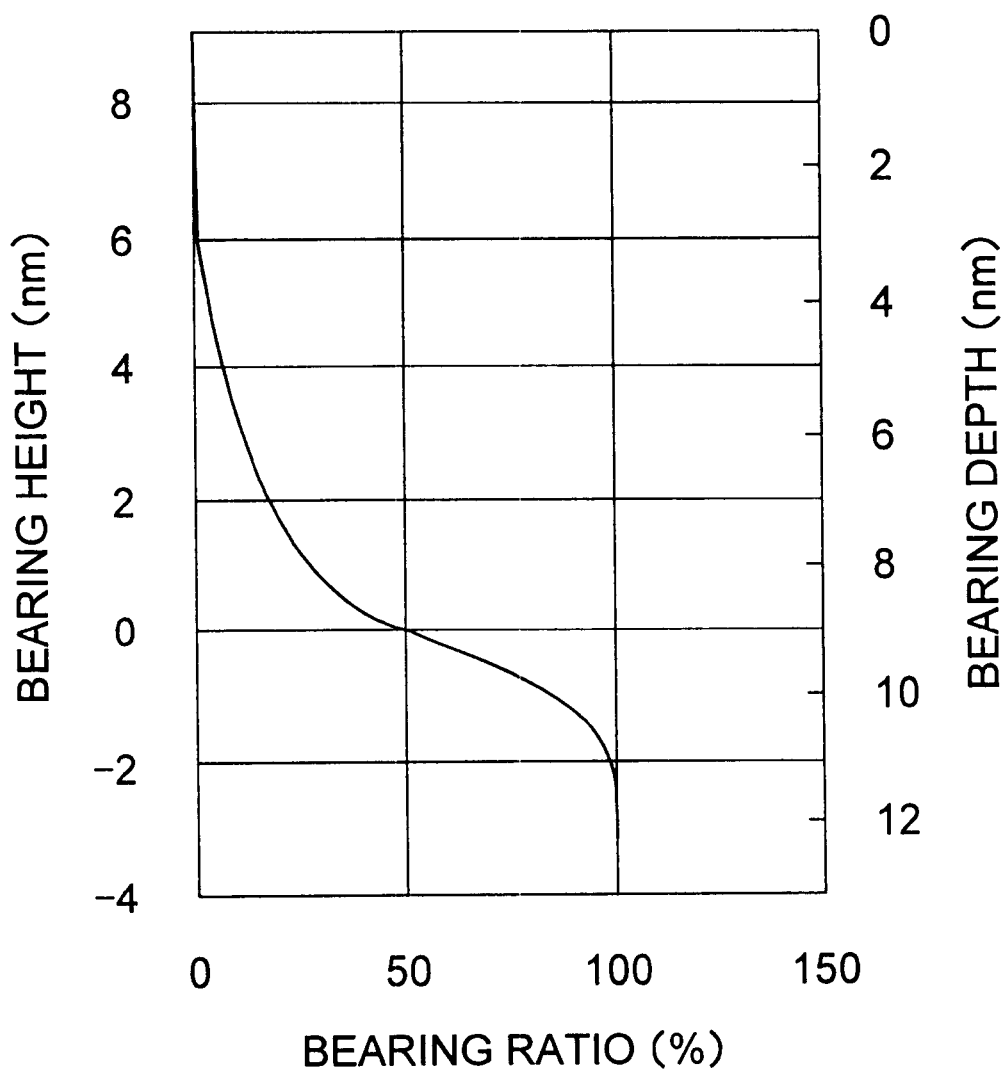
FIG. 3 is a bearing curve of surface roughness illustrated in FIG. 1.
Figure 4:
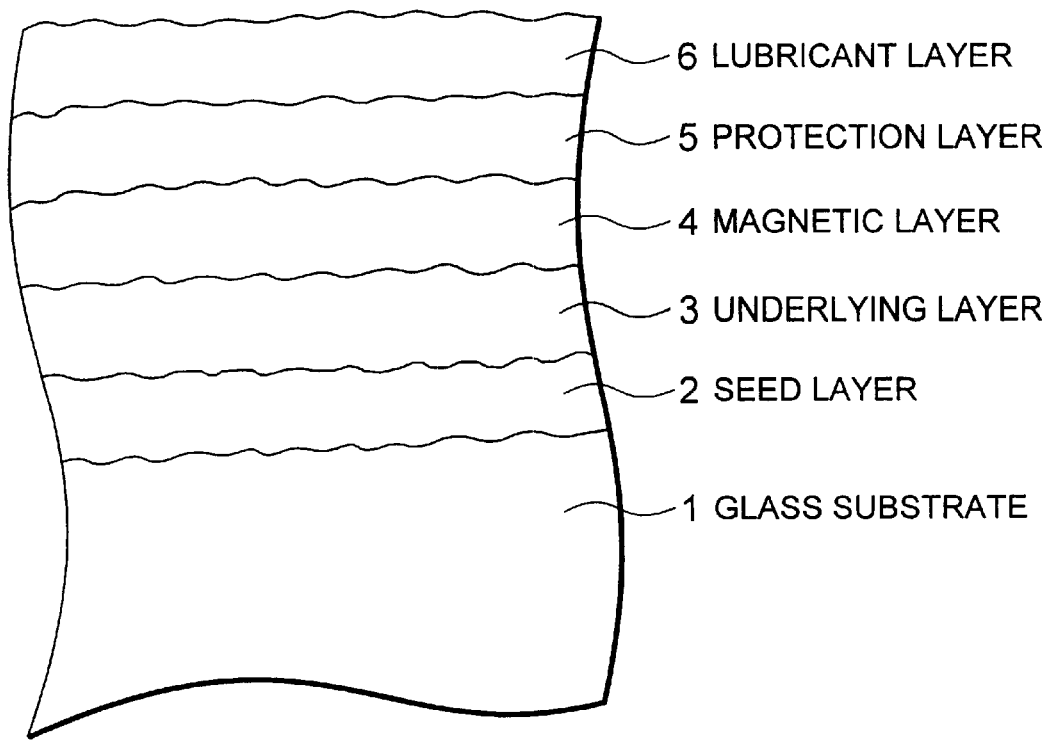
FIG. 4 is a schematic cross sectional view showing a magnetic disk according to an example 1 of this invention.

As illustrated in FIG. 4, a seed layer 2, an underlying layer 3, a magnetic layer 4, a protection layer 5 and a lubricant layer 6 are successively formed on a glass substrate 1 in a magnetic disk according to this embodiment.

The glass substrate 1 is an aluminosilicate glass which has composition of 63.5 weight % of $SiO_2$, 14.2 weight % of $Al_2O_3$, 10.4 weight % of $Na_2O$, 5.4 weight % of $Li_2O$ and 6.0 weight % of $ZrO_2$, 0.4 weight % of $Sb_2O_3$, and 0.1 weight % of $As_1O_3$, and is processed to the disk shape having outer diameter (65 mm φ), hole diameter(20 mm φ) of a central portion and a thickness of 0.635 nm. The both principle surfaces, end surfaces and chamfered portions are precisely polished and are processed the surfaces by the use of hydrofluosilic acid.

Consequently, the surface roughness of the both principle surfaces is specified by Ra=1.3 nm, Rmax=14.1 nm, Rmax/Ra=10.8, B.H. (2.5)=6.02 nm, B.H. (5.0)=4.33 nm, B.H. (2.5)/Rmax=0.43, and B.H. (5.0)/Rmax=0.31.

The seed layer 2 is a NiAl(Ni:50 at %, Al:50 at %) film having the thickness of 40 nm. The seed layer 2 has small crystal grain diameter and is superior in uniformity. In consequence, each of the underlying layer 3 and the magnetic layer 4 formed thereon has fine crystal grain diameter. Thereby, the seed layer 2 serves to reduce noise.

As the seed layer 2, NiAlRu, NiAlNd, NiAlW, NiAlTa, NiAlHf, NiAlMo, NiAlCr, NiAlZr, and NiAlNb, in which the other elements are added in addition to the NiAl other than the above-mentioned NiAl, are exemplified.

The underlying layer 3 is a CrMo (Cr:94 at %, Mo:6 at %) film having the film thickness of 25 nm. In the underlying film 3, it is desirable that difference of crystal lattice distance of the magnetic layer 4 formed thereon is reduced as possible, and the underlying layer 3 serves to improve coercive force.

Cr and CrV are exemplified other than the above-mentioned CrMo as the underlying layer 3. It is preferable to match with the lattice distance of the seed layer 2 because the crystal growth becomes excellent and the electromagnetic conversion characteristic also becomes superior.

In this event, the underlying layer 3 is not restricted to a single layer, and may be multi-structure in which the same or the different layers are laminated. For example, a multi-layer underlying layer, such as, Cr/CrMo, Cr/CrV, and CrV/CrV are exemplified.

The magnetic layer is a CoPtCrTa (Co:75 at %, Pt:5 at %, Ta:3 at %) film. Herein, it is to be noted that material of the magnetic layer of the magnetic disk of this invention is not particularly restricted. Specifically, a magnetic thin-film, such as, CoPt, CoCr, CoNiCr, CoCrTa, CoPtCr, CoNiPt, CoNiCrPt, CoNiCrTa, and CoCrTaPtNb, which contains Co as a main component, is exemplified as the magnetic layer 4.

Alternatively, a multi-structure (for example, CoCrPtTa/CrMo/CoCrPtTa), which is formed by dividing the magnetic layer with a non-magnetic film (for example, Cr, CrMo, CrV) to reduce the noise, may be used as the magnetic layer 4.

Further, the magnetic layer 4 may be granular having such a structure that magnetic particles, such as, Fe, Co, FeCo, and CoNiPt, are dispersed in a non-magnetic film consisting of material, such as, ferrite based material, iron-rare earth-based material or $SiO_2$, BN other than the above-mentioned Co based material.

Moreover, the magnetic layer 4 may be a recording form of an in-plane type or a vertical type.

The protection layer 5 is a hydrogenation carbon (H:30 at %) film having the film thickness of 10 nm. The protection film 5 achieves corrosion resistance and resistance to abrasion of the magnetic layer 4.

As the protection layer 5, carbon, nitrogen carbon, hydrogen nitrogen carbon, fluorine carbon, Cr, and $SiO_2$ are exemplified other than the above-mentioned hydrogenation carbon.

The lubricant layer 6 is a liquid lubricant film consisting of perfluoropolyether having the film thickness of 1 nm. The lubricant layer 6 achieves resistance to abrasion.

In addition, fluorocarbon based liquid lubricant material or a lubricant material consisting of alkali metal salt of sulfonic acid may be used as the material of the lubricant layer 6 other than the above-mentioned perfluoropolyether.

In this event, if the protection layer 5 has function as a solid lubricant material, the lubricant layer 6 can be omitted.

Hereinafter, description will be made about a method of manufacturing the above-mentioned magnetic disk and glass substrate for use in the magnetic disk.

Step of Producing Glass Substrate for Magnetic Disk (1) Roughing step:

First, a glass substrate of an aluminosilicate glass was cut into a disc-shape having a diameter of 66 mm and a thickness of 3 mm by a grinding stone from a sheet glass formed by the down draw method. The glass substrate was ground by a relatively rough diamond grindstone to obtain the glass substrate having the diameter of 66 mm and the thickness of 1.5 mm.

In this event, the glass substrate may be cut into the disc-shape in the same manner as the above from the sheet glass formed by the float method instead of the above-mentioned down draw method.

A chemically reinforced glass was used as the above-mentioned aluminosilicate glass. The chemically reinforced glass contains 63.5 weight % of $SiO_2$, 14.2 weight % of $Al_2O_3$, 10.4 weight % of $Na_2O$, 5.4 weight % of $Li_2O$ and 6.0 weight % of $ZrO_2$, 0.4 weight % of $Sb_2O_3$, and 0.1 weight % of $As_2O_3$.

Subsequently, the both principal surfaces of the glass substrate were ground by a diamond grindstone having grains smaller than those of the above-mentioned grindstone at every one surface.

In this case, a load was set to the extent of 100 Kg. Thereby, the both principal surfaces of the glass substrate were ground into a surface roughness Rmax of about 10 μm.

Next, an opening was formed at a center portion of the glass substrate by using a cylindrical grindstone. Further, the outer side end surface was ground to a diameter of 65 mm.

Thereafter, the outer and the inner end surfaces were chamfered. In this case, the end surface (the side surface and the chamfered portion) of the glass substrate had a surface roughness Rmax of about 4 μm.

(2) Mirror finishing step of the end surface:

Subsequently, the glass substrate was polished by the use of a brush polishing by rotating the glass substrate so that the surface roughness of the end surface portion (the angular portion, the side surface and the chamfered portion) of the glass substrate is set to about 1 μm by Rmax and to about 0.3 μm by Ra. The mirror finishing step is effective for preventing a film defect which is caused by dusts which are attached to the principal surface of the glass substrate.

In this event, the dusts are generally generated from the end surface of the glass substrate when the glass substrate is transferred or when the glass substrate is cleaned. The glass substrate was washed with water after the above-mentioned mirror finishing step.

(3) Lapping step:

The lapping step was performed for the glass substrate to improve dimension and shape accuracy. The lapping step was carried out by using the known lapping apparatus. In this case, the lapping step was conducted two times by changing grain degree from #400 to #1000.

Specifically, the lapping was performed for the both principal surfaces of the glass substrates which were contained in a carrier so that the principal surfaces had a surface accuracy of 0–1 μm and the surface roughness (Rmax) of about 6 μm.

In this event, the lapping was carried out by rotating an inner gear and an outer gear by the use of alumina grains having a grain degree of #400 in the condition that the load L was kept at about 100 Kg.

Next, the lapping was performed by changing the grain degree of the alumina grain into #1000. In this case, the surface roughness (Rmax) was set to about 2 μm. Subsequently, the glass substrate was successively immersed in washing units of natural detergent and water to be washed after the lapping step was completed.

(4) First polishing step:

Next, a first polishing step was performed by the use of a polishing apparatus to remove a defect and a distortion remaining in the above-mentioned lapping process. Specifically, a hard polisher (which may be a cerium pad LP66 made by Speedfam) was used as polisher. In this case, the first polishing was performed under the following polishing condition.

Polishing liquid: oxide cerium (grain size of 1.3 μm) (free abrasive grain)+water Load: 80–100 g/cm² (L=238 kg)

Polishing time: 30–50 minutes

Removing amount: 35–45 μm

Revolution of lower surface plate: 40 rpm

Revolution of upper surface plate: 35 rpm

Revolution of inner gear: 14 rpm

Revolution of outer gear: 29 rpm

The glass substrate was washed by being successively dipped in washing units of natural detergent, pure water, pure water, IPA (isopropyl alcohol), IPA (vapor drying) after the above polishing step. Herein, supersonic wave was applied to each washing unit.

In this event, the washing step may be omitted if a polishing liquid in the subsequent second polishing step is the same as the above case.

Further, the hard polisher used in the first polishing step is not particularly restricted, and may be suitably selected in dependency upon the surface roughness and end portion shape of the substrate as the target (or the goal)

(5) Second polishing step (Final polishing step):

Next, a second polishing was conducted by changing the above-mentioned hard polisher into a soft polisher (Kanebou N7519) by using the polishing apparatus used in the first polishing step.

The polishing condition is similar to the first polishing step except for polishing liquid of oxide cerium (grain size of 0.8 μm) (free abrasive grain)+water, the load of 80–100 g/cm², the polishing time of 9–15 minutes and the removing amount of 3–5 μm.

The surface roughness of the glass substrate obtained in this second polishing step was measured by the use of the interatomic force microscope (AFM). Consequently, Ra was equal to 0.3 nm while Rmax was equal to 3.8 nm. Herein, it is to be noted that the soft polisher used in the second polishing step is not particularly restricted.

In this event, it is desirable to use polisher having relatively small hardness to form a projection formed via the subsequent surface processing step to an island shape. Herein, the hardness (asker C) of the polisher may preferably be 60 or less, and more preferably, 50 or less.

(6) Surface processing step (Washing step):

The glass substrate was successively immersed in each processing (washing) unit of hydrofluosilic acid (concentration: 0.35%, temperature: 45° C., immersing time: 150 sec), hydrofluosilic acid (concentration: 0.28%, temperature: 45° C., immersing time: 200 sec) to be processed (washed) the surface therein after the second polishing step. In this case, a supersonic wave was applied to each of the processing (washing) units.

The glass substrate was washed by being successively dipped in each washing unit of natural detergent, pure water, pure water, IPA (isopropyl alcohol), IPA (vapor drying) after the above surface processing step. Herein, supersonic wave was applied to each washing unit except for an IPA vapor unit used in the IPA (vapor drying) step.

(7) Chemical reinforcing (chemical strengthening) step:

Next, a chemical reinforcing (chemical strengthening) step was performed for the glass substrate after the grinding, the surface polishing processing (washing) and the washing step were completed.

First, a chemical reinforcing salt was prepared by mixing potassium nitrate (60%) with sodium nitrate (40%). The chemical reinforcing salt was heated up to 400° C. The glass substrate which was washed and preheated to 300° C. was dipped in the chemical reinforcing salt for 3 hours.

The chemical reinforcing step was carried out in a holder so that the entire surface of the glass substrate was chemically reinforced with a plurality of glass substrates retained at the end surface in the holder.

Under this circumstances, lithium ions and sodium ions on a surface layer of the glass substrate were replaced by sodium ions and potassium ions in the chemical reinforcing salt by dipping each glass substrate in the chemical reinforcing salt. Thus, the glass substrate was chemically reinforced.

A compressive stress layer formed in the surface layer of the glass substrate had a thickness of about 100 to 200 $\mu$m. Next, the chemically reinforced glass substrate was dipped in a water tank of 20° C., quickly cooled and retained for 10 minutes.

(8) Washing step:

Subsequently, the cooled glass substrate was dipped in a sulfuric acid heated up to 40° C., and was washed in the condition that the supersonic wave was applied. The surface of the glass substrate obtained thus was inspected. As a result, no contaminant was detected.

In this event, the surface roughness of the principal surface of the glass substrate after the above-mentioned washing step was measured by the use of the interatomic force microscope (AFM).

As a result, when Rmax was 1.3 nm, Rmax was 14.1, B.H. (2.5) was 6.02 nm and B.H. (5.0) was 4.33 nm, Rmax/Ra was 10.8, B.H. (2.5)/Rmax was 0.43 and B.H. (5.0)/Rmax was 0.31.

In this case, Ra is representative of the center-line mean roughness (defined in Japanese Industrial Standard JIS B0601) while Rmax is defined as a maximum height representative of a difference between a highest point and a lowest point (defined in Japanese Industrial Standard JIS B0601).

Further, observation was made about the surface state of the principal surface of the glass substrate after the final polishing step and the surface state of the principal surface of the glass substrate after the washing step by the AFM.

Consequently, it was confirmed that islands (peaks) were formed at a portion of a trace of free abrasive grain in the final polishing step.

Particularly, it is assumed that a portion having a relatively high remaining distortion forms the islands (peaks) in remaining stress distribution formed on the glass principal surface by the free abrasive grain.

Step of Producing Magnetic Disk

Subsequently, a heat treatment of the glass substrate 1, deposition of a seed layer 2, deposition of an the underlying layer 3, deposition of a magnetic layer 4 and deposition of the protection layer 5 were successively carried out for the above-mentioned glass substrate 1 for the magnetic disk by the use of the known in-line sputtering apparatus.

The in-line type sputtering apparatus (not shown) has a first chamber in which a substrate heater is arranged, a second chamber in which a NiAl target (Ni: 50 at %, Al: 50 at %), a CrMo target (Cr: 94 at %, Mo: 6 at %) and a CoCrPtTa target (Co: 75 at %, Cr: 17 at %, Pt: 5 at %, Ta: 3 at %) are successively arranged, a third chamber in which a carbon target is arranged, along the moving direction.

With such a structure, the glass substrate 1 was introduced into the first chamber via a load lock chamber. The glass substrate was successively transferred into the respective chambers by a desired carrier apparatus at a constant rate to deposit and process in the following conditions.

Namely, the substrate was heated to 350° C. for 2 minutes in the first chamber. The NiAl film having the film thickness of 40 nm as the seed layer 2, the CrMo film having the film thickness of 25 nm as the underlying layer 3, the CoCrPtTa film having the film thickness of 27 nm as the magnetic layer 4 are successively deposited in the second chamber. The hydrogenation carbon film having the film thickness of 10 nm as the protection layer 5 is deposited in the third chamber.

In this case, the sputtering conditions in the second and third chambers were as follows.

Namely, the sputtering pressure was 2 mTorr in the second chamber while the sputtering pressure was 3 mTorr in the third chamber. An inactive gas of argon was used as the sputtering atmosphere in the second chamber. A mixed gas in which 8% of hydrogen is mixed into the inactive gas of argon was used as the sputtering atmosphere in the third chamber.

In this event, the sputtering power was 2 kW in the second chamber while the sputtering power was 3 kW in the third chamber.

Subsequently, the surface having the protection layer 5 was taken out from the in-line sputtering apparatus. Perfluoropolyether is applied to the surface of the protection layer 5 by the dipping process. Thereafter, the lubricant layer 6 having the film thickness of 1 nm was formed to obtain the magnetic disk of an example 1.

Table 2 represents evaluation results of the electromagnetic conversion characteristic and the CSS durability characteristic of the obtained magnetic disk. In this event, the magnetic characteristic and the record/reproduce characteristic were measured, and as a result, an excellent result was obtained. Specifically, the coercive force was 2300 Oe and the S/N ratio was 20 dB.

TABLE 2

| | Diameter of Free Abrasive Grain | Etching Time | | Total Time 1 + 2 | Rmax (nm) | Ra (nm) | Rmax/ Ra | B.H. (2.5)/ Rmax | B.H. (5.0)/ Rmax | Coefficient of friction | Glide Height | CSS Durability | Remarks |
|---|---|---|---|---|---|---|---|---|---|---|---|---|---|
| | | 1 | 2 | | | | | | | | | | |
| Example | | | | | | | | | | | | | |
| 1 | 0.8 | 150 | 200 | 350 | 14.1 | 1.3 | 10.8 | 0.43 | 0.31 | 0.6 | 0.7 | ○ | |
| 2 | 0.8 | 100 | 100 | 200 | 5.5 | 0.5 | 11.0 | 0.38 | 0.30 | 2.9 | 0.3 | ○ | |
| 3 | 0.8 | 150 | 110 | 260 | 8.2 | 0.9 | 9.1 | 0.45 | 0.35 | 2.3 | 0.4 | ○ | |
| 4 | 0.8 | 200 | 120 | 320 | 10.7 | 1.2 | 8.9 | 0.42 | 0.29 | 1.9 | 0.5 | ○ | |
| 5 | 1 | 100 | 100 | 200 | 5.2 | 0.9 | 5.6 | 0.49 | 0.44 | 2.4 | 0.3 | ○ | |
| 6 | 1 | 150 | 180 | 330 | 11.2 | 1.3 | 8.6 | 0.49 | 0.45 | 1.8 | 0.6 | ○ | |
| 7 | 1 | 200 | 180 | 380 | 12.9 | 1.1 | 11.7 | 0.40 | 0.27 | 1.8 | 0.6 | ○ | |
| 8 | 1.4 | 100 | 100 | 200 | 10.4 | 1 | 10.4 | 0.45 | 0.31 | 2.1 | 0.5 | ○ | |
| 9 | 1.4 | 150 | 170 | 320 | 12.7 | 1.4 | 9.1 | 0.50 | 0.37 | 1.6 | 0.6 | ○ | |

TABLE 2-continued

| | Diameter of Free Abrasive Grain | Etching Time 1 | Etching Time 2 | Total Time 1 + 2 | Rmax (nm) | Ra (nm) | Rmax/ Ra | B.H. (2.5)/ Rmax | B.H. (5.0)/ Rmax | Co-efficient of friction | Glide Height | CSS Durability | Remarks |
|---|---|---|---|---|---|---|---|---|---|---|---|---|---|
| 10 | 1.4 | 190 | 190 | 380 | 14.4 | 1.5 | 9.6 | 0.49 | 0.32 | 1.4 | 0.7 | ○ | |
| 11 | 1.4 | 220 | 220 | 440 | 17.4 | 1.9 | 9.2 | 0.50 | 0.34 | 0.8 | 0.9 | ○ | |
| 12 | 3 | 100 | 100 | 200 | 10.6 | 0.9 | 11.8 | 0.40 | 0.26 | 2.1 | 0.5 | ○ | |
| 13 | 3 | 130 | 130 | 260 | 13.1 | 1.2 | 10.9 | 0.43 | 0.29 | 1.7 | 0.7 | ○ | |
| 14 | 3 | 160 | 160 | 320 | 15.4 | 1.5 | 10.3 | 0.44 | 0.30 | 1.2 | 0.8 | ○ | |
| 15 | 3 | 270 | 270 | 540 | 24.8 | 2.5 | 9.9 | 0.49 | 0.35 | 0.4 | 1.2 | ○ | |
| 16 | 0.3 | 120 | 120 | 240 | 5.1 | 0.2 | 25.5 | 0.12 | 0.11 | 2.9 | 0.3 | ○ | |
| 17 | 2 | 300 | 300 | 600 | 23.8 | 0.7 | 34.0 | 0.14 | 0.12 | 1.2 | 1.2 | ○ | |
| Comparative Examples | | | | | | | | | | | | | |
| 1 | 3 | 350 | 350 | 700 | (11.1) | (1.2) | 9.3 | | | 3.2 | 2.5 | X | Thally Step Measure |
| 2 | 3 | 280 | 280 | 560 | 25.1 | 2.7 | 9.3 | 0.53 | 0.34 | 0.5 | 1.4 | ○ | Rmax, Ra are high |
| 3 | 3 | 250 | 250 | 500 | 24.4 | 2.6 | 9.4 | 0.50 | 0.34 | 0.4 | 1.3 | X | Ra is high |
| 4 | 1 | 100 | 50 | 150 | 4.9 | 0.4 | 12.3 | 0.36 | 0.24 | 3 | 0.3 | X | Rmax is low |
| 5 | 0.8 | 100 | 100 | 200 | 5.4 | 1.1 | 4.9 | 0.52 | 0.46 | 3.1 | 0.3 | X | Rmax/Ra is low |
| 6 | 0.3 | 40 | 40 | 80 | 2.8 | 0.1 | 28.0 | 0.11 | 0.09 | 3.4 | 0.3 | X | Rmax, Ra are low |
| 7 | 0.3 | 260 | 260 | 520 | 24.8 | 0.6 | 41.3 | 0.09 | 0.08 | 0.9 | 1.2 | X | Rmax/Ra is high |
| 8 | 0.2 | 100 | 120 | 220 | 6.8 | 0.3 | 22.7 | 0.17 | 0.13 | 2.8 | 0.4 | X | grain diameter is small |
| 9 | 4 | 200 | 260 | 460 | 26.7 | 1.3 | 20.5 | 0.22 | 0.15 | 2.8 | 1.4 | X | grain diameter is large |

In this case, the coercive force was measured by the use of the known vibration sample type magnetometer at a maximum external applying magnetic field of 10 KOe by cutting a sample of 8 mm φ from the manufactured magnetic disk and applying the magnetic field in the film surface direction.

Moreover, the record/reproduce characteristic (S/N ratio) was measured as follows.

Namely, the obtained magnetic disk and the MR (magneto-resistive type) head having the flying height of 0.055 μm were used. In this event, the record/reproduce characteristic in a line recording density of 163 kfcl (line recording density of 163,000 bits per 1 inch) was measured in the condition that a relative rate between the MR head and the magnetic disk was set to 9.6 m/s.

Further, medium noise during recording/reproducing signals was measured by the use of the known spectrum analyzer to calculate the S/N ratio in the condition that carrier frequency was set to 23 MHz and measuring bandwidth was set to 26 MHz. The MR head, which was used in the above-mentioned measurement, had a track width of 3.1/2.4 μm and a magnetic head gap length of 0.35/0.28 μm at write/read sides.

Further, stiction between the magnetic disk and the magnetic head did not occur in the CSS durability test of 10 tens thousand with the rotating rate of the magnetic disk of 4000 rpm using 30% slider of 3 g load in atmosphere of the room temperature and the room moisture.

Moreover, the head crush did not occur. As a result, the magnetic disk having the high CSS durability characteristic was obtained.

Further, the static coefficient of friction between the magnetic disk and the magnetic head was measured by the use of the strain gage, and it was 0.6.

Subsequently, the glide height test was carried out by the use of the AE sensor. It has been confirmed that no contact was generated between the head and the medium up to the head flying quantity of 1.0 μinch. That is, the glide height of this disk was 1.0 μinch.

From the above-mentioned result, the record/reproduce was performed with the glide height of 1.2 μinch or less, and the magnetic disk satisfied the high electro-magnetic conversion characteristic and the high CSS durability characteristic.

COMPARATIVE EXAMPLE 1

The magnetic disk was manufactured in the same manner as the example 1 except that the glass substrate was manufactured by changing the polishing condition and the surface processing time due to hydrofluosilic acid and the surface roughness of the glass substrate was evaluated by the use of the thally step.

As a result, the static coefficient of friction, the glide height (μinch), and the CSS durability characteristic are represented in Table 2 as a comparative example 1. In this case, the evaluation of the measured thally step was carried out under the condition of scanning distance (250 μm) and stylus pressure of 7 mg.

When the surface of the glass substrate for the magnetic disk was evaluated by the thally step as the comparative example (although the surface falls within the range specified by this invention), the glide height was 2 μinch or more and variation became large. This reason is explained as follows.

Namely, radius of curvature is large in the contact needle type measuring method, such as, the thally step. Consequently, fine roughness can not be captured. As a result, it is difficult to control the surface state of the magnetic disk which satisfies the glide height of 1.2 μinch or less.

Therefore, it is found out that the surface roughness must be evaluated by the use of the interatomic force microscope (AFM), which is capable of observing finer surface state, in order to control the surface state of the magnetic disk which can satisfy the glide height of 1.2 μinch or less. Hereinafter, the surface roughness of the glass substrate is measured by the AFM.

EXAMPLES 2~17,

COMPARATIVE EXAMPLES 2~9

The magnetic disk was manufactured in the same manner as the example 1 except that the surface roughness of the glass substrate was changed by changing the polishing condition and the surface processing time due to hydrofluosilic acid.

They were defined as examples 2~17 and comparative examples 2~9. In the respective cases, the surface roughness Rmax (nm), Ra (nm), Rmax/Ra, B.H. (2.5)/Rmax, B.H. (5.0)/Rmax of the principal surface of the glass substrate, the static coefficient of friction, the glide height (μinch), the CSS durability characteristic are represented in Table2.

In this case, the coercive force and the S/N ratio of the magnetic disk were measured in the examples 2~17 and the comparative examples 2~9. In consequence, the coercive force and the S/N ratio were 2200 Oe or more and 18 dB or more, respectively, and were superior values.

In the comparative example 4, the surface roughness Rmax of the principal surface of the glass substrate was not exceeding 5.0. Consequently, the magnetic head is stuck to the magnetic disk because the surface became the mirror surface state.

In comparative example 2, the surface roughness Rmax of the principal surface of the glass substrate exceeds 25.0 nm. Thereby, the glide height exceeded 1.2 μm.

In the comparative example 6, the surface roughness Ra of the principal surface of the glass substrate is not exceeding 0.2 nm. Thereby, the coefficient of friction was 3 or more. Consequently, the head crash occurred.

In the comparative example 3, the surface roughness Ra of the principal surface of the glass substrate exceeded 2.5 nm. Thereby, the glide height exceeded 1.2 μm.

In the comparative example 5, Rmax/Ra was not exceeding 8. In consequence, the coefficient of friction was 3 or more. As a result, the head crush occurred. Further, B.H. (2.5)/Rmax and B.H. (5.0)/Rmax exceeded 0.5 and 0.45, respectively.

In the comparative example 7 and the comparative example 8, Rmax/Ra exceeded 20. Thereby, the CSS durability was lowered and the head crush occurred. Further, B.H. (2.5)/Rmax and B.H. (5.0)/Rmax were not exceeding 0.1.

In the comparative example 8, the grain diameter of the free abrasive grain was not exceeding 0.3 μm. Consequently, the CSS durability was degraded because the surface roughness became small.

In the comparative example 9, the grain diameter of the free abrasive grain exceeded 0.3 μm. Consequently, the glide height exceeded 1.2 μm because the surface roughness became large.

From the above-mentioned result, it has been confirmed that the surface roughness of the glass substrate of the magnetic disk falls within the range specified by this invention and further, the grain diameter of the free abrasive grain in the final polishing step before the surface process due to the hydrofluosilic acid falls within the predetermined range in order to obtain the magnetic disk which is recorded and reproduced with the flying height of 1.2 μinch or less and which satisfies the high electro-magnetic conversion characteristic and the high CSS durability characteristic.

Reptimization of the Hydrofluosilic Acid Concentration

EXAMPLE 1, EXAMPLES 18~21,

COMPARATIVE EXAMPLES 10~12

The magnetic disk was manufactured in the same manner as the example 1 except that hydrofuosilic acid concentration was variable in the surface process due to the hydrofluosilic acid after the final polishing step.

They were defined as an example 1, examples 24~27 and comparative examples 18~20. In the respective cases, the surface roughness Rmax (nm), Ra (nm) and Rmax/Ra of the principal surface of the glass substrate, the static coefficient of friction, the glide yield are represented in Table 3.

In this event, 100 of the magnetic disks were prepared for each magnetic disk manufactured under each condition, and were inspected with 1.2 μinch flying height of the glide head. Under this circumstance, the hit magnetic disk was determined as a defective product in the glide yield.

In this case, the coercive force and the S/N ratio of the magnetic disk were measured in the examples 18~21 and the

TABLE 3

| | Concentration of 1st process | 1st Etching Time | Concentration of 2nd process | 2nd Etching Time | Rmax (nm) | Ra (nm) | Rmax/Ra | Coefficient of friction | Glide Yield (%) | Remarks |
|---|---|---|---|---|---|---|---|---|---|---|
| Example | | | | | | | | | | |
| 1 | 0.35 | 150 | 0.30 | 200 | 14.1 | 1.3 | 10.8 | 0.6 | 96 | |
| 18 | 0.60 | 200 | 0.15 | 200 | 12.4 | 1.1 | 11.3 | 1.4 | 91 | |
| 19 | 1.00 | 60 | 1.00 | 60 | 11.6 | 1.4 | 8.3 | 0.9 | 88 | |
| 20 | 2.90 | 25 | 1.00 | 25 | 12.0 | 1.5 | 8.0 | 0.8 | 75 | |
| 21 | 1.00 | 60 | 1.50 | 60 | 13.5 | 1.4 | 9.6 | 0.8 | 83 | |
| Comparative Example | | | | | | | | | | |
| 10 | 0.4 | 200 | 0.14 | 200 | 7.6 | 0.55 | 13.8 | 3.2 | 56 | concentration is low |
| 11 | 3.2 | 20 | 2 | 20 | 12.4 | 1.5 | 8.3 | 1.6 | 38 | concentration is high |
| 12 | 0.14 | 300 | 2 | 40 | 11.6 | 0.8 | 14.5 | 1.9 | 43 | concentration is low | comparative examples 10~12. In consequence, the coercive force and the S/N ratio were 2200 Oe or more and 18 dB or more, respectively, and were excellent values.

In the comparative example 11, controllability of etching was deteriorated and variation of the surface roughness became large because the hydrofluosilic acid concentration exceeded 1.0 weight %. Consequently, the magnetic disk could not be manufactured with superior reproduction.

In the comparative example 10, enough etching effect could not be obtained because the hydrofluosilic acid concentration was not exceeding 0.15 weight %. In consequence, the surface roughness of the principal surface of the glass substrate became the mirror surface, and the magnetic head is stuck thereto.

In the comparative example 12, although the hydrofluosilic concentration in the first process was not exceeding 0.15 weight %, proper roughness could be obtained by enhancing the concentration in the second process. However, the variation was large and the yield was low.

From the above-mentioned result, the surface roughness can be controlled with high accuracy by selecting the hydrofluosilic acid concentration to the predetermined range (0.15~3.0 weight %), and the stable magnetic disk can be obtained.

Further, the magnetic disk has the glide height of 1.2 μinch or less and satisfies the high electro-magnetic conversion characteristic and the high CSS durability characteristic.

Reoptimization of Surface Roughness of Glass Substrate After Final Polishing Step

EXAMPLE 1, EXAMPLES 22~27,

COMPARATIVE EXAMPLES 13~15

The magnetic disk was manufactured in the same manner as the example 1 except that the surface roughness of the glass substrate after the final polishing step was variable by changing the polishing condition.

They were defined as an example 1, examples 22~27 and comparative examples 13~15. In the respective cases, the surface roughness Rmax (nm), Ra (nm) and Rmax/Ra of the principal surface of the glass substrate, the static coefficient of friction, the glide height (μinch), and the CSS durability are represented in Table 4.

In this case, the coercive force and the S/N ratio of the magnetic disk were measured in example 1, the examples 22~27 and the comparative examples 13~15. In consequence, the coercive force and the S/N ratio were 2200 Oe or more and 18 dB or more, respectively, and were superior values.

In the comparative example 13, the surface roughness of the principal surface of the glass substrate after the final polishing step

TABLE 4

| | Rmax (nm) before processing | Rmax (nm) before processing | Rmax (nm) | Ra (nm) | Rmax/Ra | Coefficient of friction | Glide Height | CSS Durability | Remarks |
|---|---|---|---|---|---|---|---|---|---|
| Example | | | | | | | | | |
| 1 | 3.8 | 0.3 | 14.1 | 1.3 | 10.8 | 0.6 | 0.7 | ○ | |
| 22 | 1.1 | 0.1 | 5.9 | 0.3 | 19.7 | 2.8 | 0.3 | ○ | |
| 23 | 6.5 | 0.5 | 16.8 | 1.5 | 11.2 | 1.1 | 0.8 | ○ | |
| 24 | 11.2 | 0.6 | 17.2 | 1.8 | 9.6 | 0.9 | 0.9 | ○ | |

TABLE 4-continued

|  | Rmax (nm) before processing | Rmax (nm) before processing | Rmax (nm) | Ra (nm) | Rmax/ Ra | Coefficient of friction | Glide Height | CSS Durability | Remarks |
|---|---|---|---|---|---|---|---|---|---|
| 25 | 13.5 | 0.5 | 21.4 | 1.7 | 12.6 | 0.5 | 1.1 | ○ | |
| 26 | 19.8 | 0.6 | 23.4 | 2.1 | 11.1 | 0.2 | 1.2 | ○ | |
| 27 | 15.2 | 1 | 14.8 | 1.9 | 7.8 | 0.9 | 0.7 | ○ | |
| Comparative Example | | | | | | | | | |
| 13 | 0.9 | 0.09 | 3.2 | 0.4 | 8.0 | 3.1 | 0.3 | ○ | Rmax, Ra are low |
| 14 | 5 | 1.2 | 17.6 | 2.8 | 6.3 | 0.5 | 0.9 | X | Ra is high |
| 15 | 22 | 1.8 | 29.0 | 3.4 | 6.5 | 0.4 | 1.5 | ○ | Rmax, Ra are high | was not exceeding 1.0 nm by Rmax, and not exceeding 0.1 nm by Ra. Consequently, the roughness was small after the hydrofluosilic acid process and the coefficient of friction exceeded 3.

In the comparative example 14, the surface roughness of the principal surface of the glass substrate after the final polishing step exceeded 1.0 nm by Ra. Consequently, the CSS durability was lowered and the head crush occurred because Ra after the hydrofluosilic acid process became 2.5 nm or more.

In the comparative example 15, the glide height was 1.2 μinch or more because Rmax and Ra were large.

From the above-mentioned result, variation of the islands (peaks) of the finally obtained glass substrate surface could be suppressed by selecting the surface roughness of the glass substrate after final polishing step to the predetermined roughness.

Further, the magnetic disk has the glide height of 1.2 μinch or less and satisfies the high electro-magnetic conversion characteristic and the high CSS durability characteristic.

Glass Type, Kind of Glass, Glass Composition

EXAMPLE 28,

COMPARATIVE EXAMPLES 16~17

The magnetic disk was manufactured in the same manner as the example 1 except that the glass substrate was changed into an aluminosilicate glass (example 28), a quartz glass (comparative example 16) and a soldalime glass (comparative example 17), and the polishing condition for setting the surfaces of these glass substrates to desired surface roughness and the surface processing condition due to the hydrofluosilic acid were suitably changed.

In this case, the aluminisilicate glass used in the above-mentioned example 28 had composition of 64.0 weight % of $SiO_2$, 16.0 weight % of $Al_2O_3$, 9.0 weight % of $Na_2O$, 7.0 weight % of $Li_2O$ and 4.0 weight % of $ZrO_2$.

On the other hand, the solalime glass used in the above-mentioned example 17 had composition of 72.5 weight % of $SiO_2$, 15.0 weight % of $Na_2O$, 1.0 weight % of $Al_2O_3$, 9.0 weight % of CaO, and 2.5 weight % of MgO.

As a result, the surface roughness was 1.2 nm by Ra and was 11.0 nm by Rmax in the example 28. Further, the coefficient of friction was 1.9 and the CSS durability was also excellent.

However, the surface roughness of the comparative examples 16 and 17 was largely different in comparison with the above examples 1~28. Specifically, the static coefficient of friction was 3 or more and the superior result could not be obtained in the CSS durability characteristic.

Herein, examination has been made about a reason regarding differences between ways, in which the projection is formed, in dependency upon the kind of the glass (glass type, glass composition) from the results of the above-mentioned example and the comparative examples 16 and 17.

It is assumed that an exchange reaction occurs between $H^+$ contained in the water and alkali ion ($Na^+$, $Li^+$) contained in the glass in the polishing step due to the free abrasive grain of the glass substrate surface.

By this exchange reaction, a hydration layer was formed. In the hydration layer, OH was attached to Si or Al which forms a network of the glass by the exchange reaction. It is assumed that the distribution of the thickness of the hydration layer was formed in accordance with the stress distribution applied by the free abrasive grain in the hydration, and the roughness was formed in dependency upon the etching rate.

Herein, it is to be noted that the etching rate is small at a portion having large stress while the etching rate is large at a portion having a small stress.

The formation of the hydration layer relates with the roughness (projections) and depends upon the difference of the kind of the glass (glass type, glass composition).

Subsequently, examination will be made about the glass composition for forming the island (peak) by the manufacturing method according to this invention.

Seven kinds of glass materials having different composition ratios illustrated in Table 5 were prepared, and the glass substrates were manufactured in the same manner as the example 1.

TABLE 5

|  | SiO2 | Al2O3 | Na2O | MgO | CaO | ZrO2 | TiO2 |
|---|---|---|---|---|---|---|---|
| Glass A | 65.5 (63.5) | 8.6 (14.1) | 12.5 (6.0) | 10.4 (10.4) | | 3.0 (6.0) | 3.0 |

TABLE 5-continued

|  | SiO2 | Al2O3 | Na2O | MgO | CaO | ZrO2 | TiO2 |
|---|---|---|---|---|---|---|---|
| Glass B | 65.5 | 7.6 | 12.5 | 10.4 | 0.5 | 0.5 | 3.0 |
|  | (64.0) | (12.6) | (6.1) | (10.5) | (0.3) | (0.5) | (6.0) |
| Glass C | 65.5 | 6.6 | 12.5 | 10.4 | 1.0 | 1.0 | 3.0 |
|  | (64.6) | (11.0) | (6.1) | (10.6) | (0.7) | (0.9) | (6.1) |
| Glass D | 65.5 | 5.6 | 12.5 | 10.4 | 1.5 | 1.5 | 3.0 |
|  | (65.2) | (9.5) | (6.2) | (10.7) | (1.0) | (1.4) | (6.1) |
| Glass E | 63.5 | 7.6 | 12.5 | 10.4 | 0.5 | 0.5 | 3.0 | 2.0 |
|  | (61.7) | (12.5) | (6.0) | (10.4) | (0.3) | (0.5) | (6.0) | (2.6) |
| Glass F | 63.5 | 6.6 | 12.5 | 10.4 | 1.0 | 1.0 | 3.0 | 2.0 |
|  | (62.2) | (11.0) | (6.1) | (10.5) | (0.7) | (0.9) | (6.0) | (2.6) |
| Glass G | 63.5 | 5.6 | 12.5 | 10.4 | 1.5 | 1.5 | 3.0 | 2.0 |
|  | (62.8) | (9.4) | (6.1) | (10.6) | (1.0) | (1.4) | (6.1) | (2.6) |

Herein, the surface of the glass substrate before the hydrofluosilic acid process and the surface of the glass substrate after the hydrofluosilic acid process were observed by the use of the interatomic force microscope (AFM).

As a result, it has been confirmed that when the glass substrate contains no $TiO_2$, the surface roughness indicated in the above example did not become remarkable and the island (peak) was not readily formed in the glass substrate which contains the alkali earth oxide (MgO, CaO) of 2 mol % or more (1.6 wt % or more) in the total content.

On the other hand, it has been confirmed that when the glass substrate contains $TiO_2$, the surface roughness indicated in the above example did not become remarkable and the island (peak) was not readily formed in the glass substrate which contains the alkali earth oxide (MgO, CaO) of 3 mol % or more (2.4 wt % or more) in the total content.

From the above-mentioned result, it has been found out that the glass composition for forming the island (peak) by the manufacturing method of this invention preferably contains the alkali earth oxide of not exceeding 3 mol % (not exceeding 2.4 wt %) in the total content and contains the alkali metal oxide which forms the hydration layer by the polishing step. More preferably, the total content of the alkali earth oxide is not exceeding 2 mol % (not exceeding 1.6 wt %).

Therefore, it is confirmed that the glass used in the manufacturing method according to this invention satisfies the above-mentioned condition and may contain 58~75 weight % of $SiO_2$, 5~23 weight % of $Al_2O_3$, 3~10 weight % of $Li_2O$, and 4~13 weight % of $Na_2O$ as main components in the composition ratio and preferably does not contains alkali earth metal (oxide).

In particular, the aluminosilicate glass specified in the claim 13 is desirable in the above-mentioned polishing condition and the surface processing condition due to the hydrofluosilic acid.

However, the magnetic disk had the glide height of 1.2 µinch or less and satisfied the high electro-magnetic conversion characteristic and the high CSS durability characteristic by setting the condition of the surface roughness specified in the claims 1~3 and by selecting the polishing condition and the surface processing condition in the glass substrate other than the glass specified in the claims 12~13.

Further, although the glass substrate is excessively smooth and does not have the surface roughness specified in the claims 1~3, the same effect as this invention can be obtained by forming fine projections on the principal surface of the glass substrate and by selecting the surface roughness specified in the claims 1~3.

As mentioned before, explanation mainly has been made about the range of the surface roughness of the glass substrate for the magnetic recording medium for obtaining the desired glide height, the coefficient of friction, and the CSS durability.

Hereinafter, examination will be made about effects in which the polishing condition (polishing abrasive grain), the surface condition (the concentration of the hydrofluosilic acid, the immersing time into the hydrofluosilic acid, and the temperature of the hydrofluosilic acid) give for the surface roughness of the glass substrate, and explanation will be made about a method of controlling the surface roughness parameter.

Figure 5:
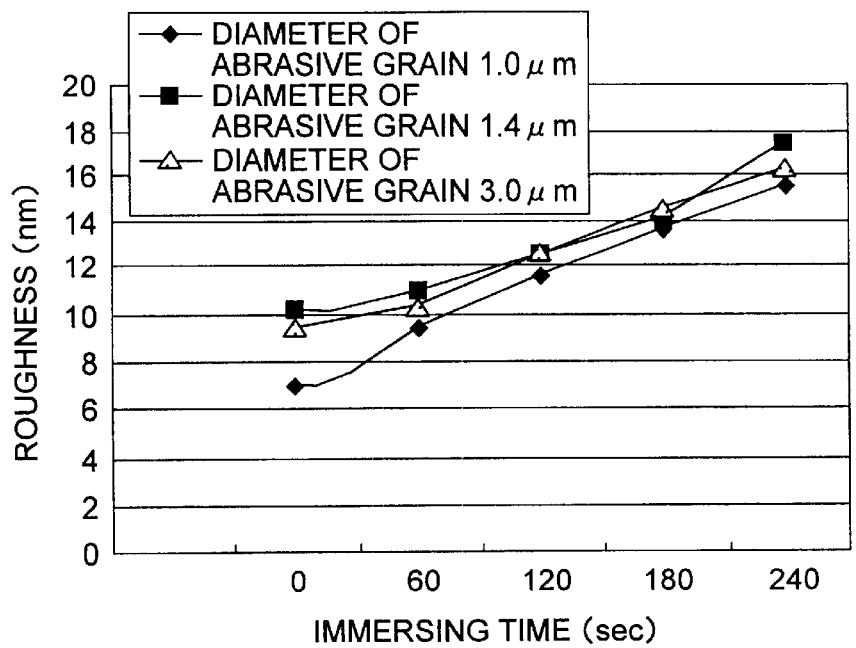
FIG. 5 is a graph showing a relationship between immersing time into hydrofluosilic acid and Rmax.
Figure 6:
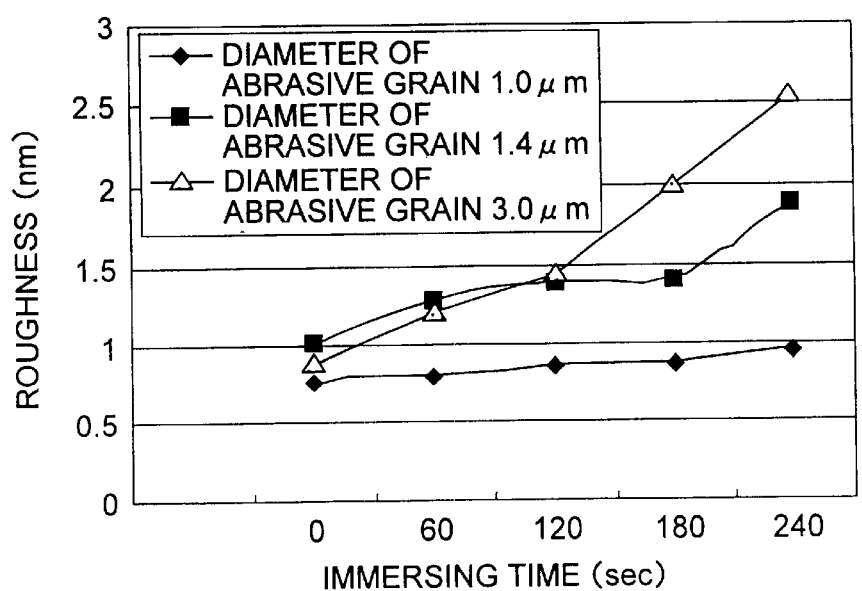
FIG. 6 is a graph showing a relationship between immersing time into hydrofluosilic acid and Ra.

FIGS. 5 and 6 are graphs which represent the relationship between the immersing time into the hydrofluosilic acid and Rmax, and the relationship between the immersing time into the hydrofluosilic acid and Ra when the grain diameter of the abrasive grain are variable.

In this event, the concentration and the temperature of the hydrofluosilic acid are constant, and are 0.28 weight % and 45° C., respectively.

As illustrated in FIG. 5, Rmax does not depends upon the grain diameter of the abrasive grain. There is correlation between the immersing time into the hydrofluosilic acid and Rmax. Rmax can be controlled by adjusting the immersing time into the hydrofluosilic acid, as shown in FIG. 5.

As illustrated in FIG. 6, there is correlation between the grain diameter of the abrasive grain and Ra in accordance with the immersing time into the hydrofluosilic acid (for example, the immersing time is 180 sec), and Ra can be controlled by adjusting the grain diameter of the abrasive grain.

Further, the concentration of the hydrofluosilic acid and the temperature of the hydrofluosilic acid relate with the etching rate. As the concentration and the temperature become higher, the etching rate tends to be quicker and the surface roughness Rmax tends to be larger.

When the glass substrate for the magnetic recording medium is practically fabricated by the manufacturing method of this invention, the surface roughness is largely changed based upon the variation of the hydrofluosilic acid concentration and the hydrofluosilic acid temperature. Therefore, it is necessary to monitor the hydrofluosilic acid concentration and the hydrofluosilic acid temperature so that constant etching concentration is always kept.

In particular, the hydrofluosilic acid concentration relates with the conductivity, and the etching rate can be precisely controlled by monitoring the conductivity.

Description has been made about the magnetic recording medium which is mainly used in the CSS method in the above-mentioned examples.

Thereinafter, explanation will be made about the typical glass substrate for magnetic recording medium and the manufactured magnetic recording medium which are used in the load•unload method.

The glass substrate for the magnetic recording medium, which had the surface roughness specified by Rmax=4.3 nm, Ra=0.46 nm, and Rmax/Ra=9.3, was manufactured by suitably adjusting the grain diameter of the polishing abrasive grain and the surface process condition (the hydrofluosilic acid concentration, the hydrofluosilic acid temperature, the immersing time into the hydrofluosilic acid) in an example 1.

The magnetic recording medium was obtained by depositing the seed layer 2, the underlying layer 3, the magnetic layer 4, the protection layer 5 and the lubricant layer 6 on the obtained glass substrate 1 as the same manner as the example 1.

In the obtained magnetic recording medium, both the coercive force and the S/N ratio were excellent, the glide characteristic was also superior, and the flying characteristic was also excellent without the head crush.

Although the invention has been so far explained with the preferred embodiments, this invention is not always restricted to the above-mentioned embodiments. For example, although the surface process due to the hydrofluosilic acid was performed twice, the surface process step may be performed once, and alternatively, may be performed three times or more.

Further, although the chemically reinforced glass substrate was used as the glass substrate of this invention, and the chemically reinforced step was performed after the surface process due to the hydrofluosilic acid, the surface process due to the hydrofluosilic acid may be carried out after the chemically reinforced process.

When the glass substrate is polished by the use of the free abrasive grain and the above surface process due to the hydrofluosilic acid is performed immediately after the glass substrate surface is chemically reinforced, the remaining distortion formed by the free abrasive grain on the glass substrate surface is buried in the stress of the chemical reinforcement. This is undesirable because the surface roughness can not be controlled.

However, the same result as the above-mentioned case can be obtained by interposing the polishing processing step due to the free abrasive grain between (immediately after the surface process due to the hydrofluosilic acid) the chemical reinforcement process step and the surface process due to the hydrofluosilic acid as the chemical reinforcement step→the polishing step due to the free abrasive grain→the surface process due to the hydrofluosilic acid.

Further, the disk manufactured by this invention is not restricted to the CSS method, and can be used in the zone-texture method or the load•unload method.

As mentioned before, when the surface roughness of the principal surface of the glass substrate is measured by the interatomic force microscope (AFM), the surface roughness becomes the specific state in this invention.

Consequently, the glass substrate and the magnetic medium satisfy the glide height of 1.2 μinch, the high electro-magnetic conversion characteristic and the high CSS durability.

Further, it is possible to obtain the above specific surface roughness state by chemically processing the glass substrate, which has the desired surface roughness state, by the use of the hydrofluosilic acid when the surface roughness of the principal surface is measured by the interatomic force microscope (AFM).

Moreover, the surface roughness of the principal surface of the glass substrate is controlled so that Ra, Rmax, and Rmax/Ra specified by the interatomic force microscope (AFM) and the ratio between the bearing height of the contour surface having the specific bearing ratio and Rmax fall within the specific range.

Thereby, the glass substrate satisfies the high electro-magnetic conversion characteristic and the high CSS durability.

What is claimed is:

1. A method of manufacturing a glass substrate which is for use in a magnetic recording medium, comprising the steps of:

preparing a glass member in which Ra falls within the range between 0.1 and 1.0 nm when a surface roughness of a principal surface of said glass member is measured by the use of the interatomic force microscope (AFM), and chemically processing the surface so that Ra falls within the range between 0.2 and 2.5 nm, Rmax falls within the range between 3 and 25 nm, and Rmax/Ra falls within the range between 3 and 35, said glass member having surface roughness Ra and Rmax, where Ra is representative of a center-line mean roughness, Rmax is defined as a maximum height representative of a difference between a highest point and a lowest point.

2. A method as claimed in claim 1, further comprising the steps of:

polishing at least the principal surface by the use of abrasive materiel containing free abrasive grain having grain diameter between 0.3 and 3.0 μm before the chemical surface process or the surface process due to a hydrofluosilic acid.

3. A method as claimed in claim 2, wherein:

the chemical surface process or the surface process due to the hydrofluosilic acid processes a portion of the surface having relatively high remaining distortion so that it forms an island or peak in remaining stress distribution which is generated at a portion of abrasive trace due to the abrasion grain in the polishing step of the glass member.

4. A method of manufacturing a glass substrate which is for use in a magnetic recording medium, comprising the steps of:

preparing a glass member in which Ra falls within the range between 0.1 and 1.0 nm when a surface roughness of a principal surface of said glass member is measured by the use of the interatomic force microscope (AFM), and processing at least the principle surface by the use of hydrofluosilic acid, said glass member having surface roughness Ra where Ra is representative of a center-line mean roughness.

5. A method as claimed in claim 4, further comprising the steps of:

polishing at least the principal surface by the use of abrasive material containing free abrasive grain having grain diameter between 0.3 and 3.0 μm before the surface process due to the hydrofluosilic acid.

6. A method as claimed in claim 5, wherein:

the chemical surface process or the surface process due to the hydrofluosilic acid processes a portion of the surface having relatively highly remaining distortion so that it forms an island or peak in remaining stress distribution which is generated at a portion of abrasive trace due to the abrasive grain in the polishing step of the glass member.

7. A method of manufacturing a glass substrate which is for use in a magnetic recording medium and which has surface roughness Ra and Rmax, where Ra is representative of a center-line mean roughness, Rmax is defined as a maximum height representative of a difference between a highest point and a lowest point, comprising the steps of:

specifying a surface state of said glass substrate to improve the flying characteristic of a magnetic head within a specific range Ra, Rmax and Rmax/Ra measured by the use of the interatomic force microscope (AFM);

processing the surface of the glass substrate under various surface processing conditions;

determining the surface processing condition so that Ra, Rmax and Rmax/Ra measured by the use of the interatomic force microscope (AFM) after the process falls within the specific range; and processing the surface of said glass substrate based upon the determined surface processing condition.

8. A method as claimed in claim 7, wherein:

the surface process is carried out by the use of hydrofluosilic acid.

9. A method as claimed in any one of claims 1, 4, 2, 3 or 5 wherein:

the glass constituting said glass member contains at least alkali metal oxide and alkali earth oxide, and content of the alkali earth oxide is not exceeding 3 mol %.

10. A method as claimed in claim 9, wherein:

the glass constituting said glass member contains $SiO_2$ between 58 and 75 weight %, $Al_2O_3$ between 5 and 23 weight %, $Li_2O$ between 3 and 10 weight %, and $Na_2O$ between 4 and 13 weight % as main components.

11. A method as claimed in claim 10, wherein:

the glass contains $SiO_2$ between 62 and 75 weight %, $Al_2O_3$ between 5 and 15 weight %, $Li_2O$ between 4 and 10 weight %, $Na_2O$ between 4 and 12 weight %, and $ZrO_2$ between 5.5 and 15 weight % as main components, and weight ratio of $Na_2O/ZrO_2$ falls within the range between 0.5 and 2.0 while weight ratio of $Al_2O_3/ZrO_2$ falls within the range between 0.4 and 2.5.

12. A method as claimed in any one of claims 1,4,2,3,5, or 6, wherein:

the step of chemically processing the surface or a chemical reinforcement process is carried out after the surface due to a hydrofluosilic acid.

13. A method of manufacturing a magnetic recording medium, wherein:

at least a magnetic layer is formed on the principal surface of the glass substrate manufactured by the method claimed in any one of 1,4,2,3,5 or 6.

14. A method as claimed in any one of claims 4, 2, 3, 5 or 6 wherein:

the hydrofluosilic acid has concentration between 0.15 and 3.0 by weight %.

15. A method of manufacturing a glass substrate which is for use in a magnetic recording medium and which has surface roughness Ra and Rmax, where Ra is representative of a center-line mean roughness, Rmax is defined as a maximum height representative of a difference between a highest point and a lowest point, a surface parallel to a virtual principal surface is defined as a contour surface when it is assumed that the principal surface of the glass substrate is completely flattened, when roughness formed on the principal surface of the glass substrate are cut by the use of the contour surface, a percentage rate of a total area of the principal surface for sum or areas of the cut cross sectional surface is defined as a bearing ratio, the contour surface having the bearing ratio of 50% is defined as a referential surface, and each distance from the referential surface to each contour surface having each bearing ratio is specified as a bearing height (B.H.), comprising the steps of:

specifying a surface state of the glass substrate to improve flying characteristic of a magnetic head at every kinds of the magnetic head within Ra, Rmax, Rmax/Ra, and a specific range ratio (B.H./Rmax) of the bearing height (B.H.) and Rmax measured by the use of the interatomic force microscope (AFM);

processing the surface of the glass substrate under various surface processing conditions;

determining the surface processing condition so that Ra, Rmax, Rmax/Ra, and B.H./Rmax measured by the use of the interatomic force microscope (AFM) after the process falls within the specific range; and processing the surface of the glass substrate based upon the determined surface processing condition.

16. A method as claimed in claim 15, wherein:

the surface process is carried out by the use of hydrofluosilic acid.

17. A method of manufacturing a glass substrate which is for use in a magnetic recording medium, comprising the steps of:

preparing a glass member in which Ra falls within the range between 0.1 and 1.0 nm when a surface roughness of a principal surface of said glass member is measured by the use of the interatomic force microscope (AFM), and chemically processing the surface so that Ra falls within the range between 0.2 and 2.5 nm, Rmax falls within the range between 3 and 25 nm, Rmax/Ra falls within the range between 3 and 35, B.H.(2.5)/Rmax falls within the range between 0.1 and 0.5, and B.H.(5.0)/Rmax falls within the range between 0.1 and 0.45, wherein said glass member having surface roughness Ra and Rmax, where Ra is representative of a center-line mean roughness, Rmax is defined as a maximum height representative of a difference between a highest point and a lowest point, and wherein a surface parallel to a virtual principal surface is defined as a contour surface when it is assumed that the principal surface of said glass substrate is completely flattened, when roughness formed on the principal surface are cut by the use of the contour surface, a percentage rate of a total area of the principal surface for sum of areas of the cut cross sectional surface is defined as a bearing ratio, the contour surface having the bearing ratio of 50% is defined as a referential surface, each distance from the referential surface to each contour surface having each bearing ratio is specified as a bearing height, the bearing height of the contour surface having the bearing ratio of 2.5% is defined as B.H. (2.5) while the bearing height of the contour surface having the bearing ratio of 5.0% is defined as B.H. (5.0).

18. A method as claimed in claim 17, wherein:

the surface process is carried out by the use of hydrofluosilic acid.

* * * * *